US012162742B2

(12) United States Patent
Branco, Jr.

(10) Patent No.: US 12,162,742 B2
(45) Date of Patent: Dec. 10, 2024

(54) CUSTOMIZABLE LIQUID BLENDING AND LIQUID DISPENSING SYSTEM

(71) Applicant: Jeffrey Michael Branco, Jr., Arroyo Grande, CA (US)

(72) Inventor: Jeffrey Michael Branco, Jr., Arroyo Grande, CA (US)

( * ) Notice: Subject to any disclaimer, the term of this patent is extended or adjusted under 35 U.S.C. 154(b) by 200 days.

(21) Appl. No.: 17/871,778

(22) Filed: Jul. 22, 2022

(65) Prior Publication Data

US 2024/0025724 A1 Jan. 25, 2024

(51) Int. Cl.
*B67D 1/08* (2006.01)
*B01F 33/84* (2022.01)
(Continued)

(52) U.S. Cl.
CPC .......... *B67D 1/0888* (2013.01); *B01F 33/846* (2022.01); *B67D 1/0016* (2013.01);
(Continued)

(58) Field of Classification Search
CPC ................ B67D 1/0888; B67D 1/0016; B67D 1/0036; B67D 1/0041; B67D 1/1284;
(Continued)

(56) References Cited

U.S. PATENT DOCUMENTS 4,143,793 A * 3/1979 McMillin ............. B67D 1/1245 222/64
4,520,950 A * 6/1985 Jeans ................... B67D 1/0021 137/614.04

(Continued)

FOREIGN PATENT DOCUMENTS

WO WO-2006131431 A1 * 12/2006 ........... B67D 1/0036
WO 2016121601 8/2016

OTHER PUBLICATIONS

Burke; "Knowledge-based recommender systems"; Department of Information and Computer Science, University of California, Irvine; 2000; https://www.cs.odu.edu/~mukka/cs795sum09dm/Lecturenotes/Day6/burke-elis00.pdf; 23 pages.

(Continued)

*Primary Examiner* — Donnell A Long
(74) *Attorney, Agent, or Firm* — Fitch, Even, Tabin & Flannery LLP

(57) ABSTRACT

One or more aspects of the present disclosure provide improved liquid systems, as well as improved liquid system techniques. For example, a liquid system may include a liquid blending system and a liquid dispensing system that more efficiently meets the demands of consumers/users. Specifically, liquid blending and dispensing systems described herein may facilitate user blending of various liquids, accurate user identification of sensory characteristics associated with various liquid blends and liquid blend components, efficient handling of user feedback and refinement of subsequent liquid blends, etc. For instance, a liquid blending system may take user selection input and provide a liquid. The liquid system may store data describing the provided liquid in a database. Further, the liquid system may receive and analyze user input regarding the provided liquid and provide a subsequent liquid blend recipe based on the user input and the stored data describing the original blend.

35 Claims, 24 Drawing Sheets

(51) Int. Cl.
*B67D 1/00* (2006.01)
*B67D 1/12* (2006.01)

(52) U.S. Cl.
CPC ......... *B67D 1/0036* (2013.01); *B67D 1/0041* (2013.01); *B67D 1/1284* (2013.01); *B67D 2210/00091* (2013.01)

(58) Field of Classification Search
CPC ............. B67D 2210/00091; B67D 2210/0006; B67D 1/1218; B67D 1/1231; B67D 1/1295; B01F 33/846
See application file for complete search history.

(56) References Cited

U.S. PATENT DOCUMENTS 5,903,465 A * 5/1999 Brown .................... G07F 17/18
700/242
6,622,064 B2 * 9/2003 Bartholomew ......... G07F 17/18
700/239
7,593,863 B1 9/2009 Sunshine
7,820,214 B2 10/2010 Groenke
9,260,228 B2 2/2016 Buck
10,390,653 B2 8/2019 Lüssi
10,817,778 B2 10/2020 Baughman
10,849,406 B2 * 12/2020 Samain ............... B01F 33/8442
11,542,149 B2 * 1/2023 Comunale ............ B67D 1/0462
2002/0036950 A1 * 3/2002 Cosman ................ B01F 33/846
366/152.2
2006/0118581 A1 * 6/2006 Clark .................... B01F 33/846
222/333
2010/0025981 A1 2/2010 Lay
2011/0038998 A1 2/2011 Kohli
2012/0035761 A1 * 2/2012 Tilton .................. B67D 1/0057
700/239
2012/0116563 A1 5/2012 Bippert
2012/0226698 A1 9/2012 Silvestre
2013/0339348 A1 12/2013 Pickelsimer
2014/0324624 A1 10/2014 Ward
2016/0090288 A1 3/2016 Givens, Jr.
2016/0368752 A1 * 12/2016 Bethuy ................ B67D 1/0869
2019/0381654 A1 12/2019 Oleynik
2020/0031656 A1 * 1/2020 Rudick ................... G06F 3/013
2020/0057950 A1 2/2020 Dillon
2020/0184538 A1 6/2020 Wilson
2020/0198958 A1 6/2020 Kline
2021/0008514 A1 1/2021 Lasala Alonso

OTHER PUBLICATIONS

Viejo et al; "Emerging Technologies Based on Artificial Intelligence to Assess the Quality and Consumer Preference of Beverages"; Beverages 2019, 5, 62; www.mdpi.com/journal.beverages; Published Nov. 1, 2019; 25 pages.

* cited by examiner

CUSTOMIZABLE LIQUID BLENDING AND LIQUID DISPENSING SYSTEM

BACKGROUND OF THE INVENTION

1. Field of the Invention

The present invention relates generally to liquid systems (e.g., systems for providing consumable liquids or beverages), and more specifically to customizable liquid blending and liquid dispensing system.

2. Discussion of the Related Art

Various systems and processes are known in the art for customizable liquid blending and liquid dispensing system.

Consumable liquids (e.g., beverages) may be utilized or ingested by humans and animals for many uses, such as for hydration, for sustenance, to satisfy thirst, to play roles in various human cultural activities, etc. For instance, alcoholic liquids (e.g., consumable beverages which contain the drug ethanol, such as liquor, beer, wine, etc.) have been a part of human culture for more than 8,000 years. Common types of consumable liquids may include water, milk, juices, smoothies, soft drinks, coffees, and teas among numerous other examples.

Currently, some consumable liquids may be highly commercialized and are often met with high market demand. That is, consumable liquids, such as flavored water, soft drinks, various alcoholic beverages, etc., may exist in the marketplace, and such consumable liquids may vary widely in terms of availability, cost, sensory characteristics (e.g., such as flavor, appearance, smell), etc.

For instance, alcoholic beverages may be extensively designed and manufactured to meet various user demands. However, with numerous options available, many consumers may be uninformed, overwhelmed, etc. regarding selection of available beverages. As an example, with over 40,000 different wines available on the market at any one time, choosing a wine at a store or restaurant may be intimidating or otherwise unpleasant for a consumer. Moreover, due to wine's complexity, many users may choose a wine by its label or rely on expert advice (e.g., even though a label may not be an indicator of wine quality, preferences of experts may be different from preferences of the consumer, experts may be incentivized to sell certain wines by management or suppliers etc.).

As such, current liquid systems (e.g., systems for providing consumable beverages to users/consumers) may be inefficient in many ways. For example, liquid systems may be inefficient in terms of how beverages are selected by users/consumers, inefficient in terms of how user/consumer preferences are identified and accounted for, inefficient in terms of how user/consumer feedback is incorporated for future beverage selections, etc. Accordingly, there is generally need in the art for improved liquid systems (e.g., including more effective liquid blending and dispensing systems).

SUMMARY

A method, apparatus, non-transitory computer readable medium, and system for customizable liquid blending and liquid dispensing system are described. One or more aspects of the method, apparatus, non-transitory computer readable medium, and system include displaying, on a display of a liquid blending system, a whiteboard area defining a workspace for liquid blend manipulation; receiving, by the liquid blending system, of a first liquid selection input from a user, wherein the first liquid selection input includes selecting a first liquid of a plurality of liquids available for selection and selecting a first coordinate location in the whiteboard area; updating, by the liquid blending system, of the display to show a first liquid whiteboard graphical indication of the first liquid at the first coordinate location; receiving, by the liquid blending system, of a second liquid selection input from the user, wherein the second liquid selection input includes selecting a second liquid of the plurality of liquids and selecting a second coordinate location in the whiteboard area; updating, by the liquid blending system, of the display to show a second liquid whiteboard graphical indication of the second liquid at the second coordinate location; and determining, by the liquid blending system, of a first liquid blend recipe for a blend of the first liquid and the second liquid, wherein the proportions of the first liquid and the second liquid in the first liquid blend recipe are determined using an algorithm, running on a processor of the liquid blending system, that includes as inputs the first coordinate location and the second coordinate location.

An apparatus, system, and method for customizable liquid blending and liquid dispensing system are described. One or more aspects of the apparatus, system, and method include a liquid blending system comprising: at least one liquid database including data for each of a plurality of liquids at least one user database including data for each of a plurality of users a computing device including a processor and non-transitory memory a liquid blending application configured to run on the computing device, the liquid blending application in communication with the at least one liquid database and the at least one user database a user interface in communication with the liquid blending application and configured to receive input from a user a display in communication with the liquid blending application, wherein the liquid blending system is configured to: display, on the display, a whiteboard area defining a workspace for liquid blend manipulation and a graphical indication of each of a plurality of liquids receive a first liquid selection input from a user of the plurality of users, wherein the first liquid selection input includes selecting a first liquid of the plurality of liquids and selecting a first coordinate location in the whiteboard area update the display to show a graphical indication of the first liquid at the first coordinate location receive a second liquid selection input from the user, wherein the second liquid selection input includes selecting a second liquid of the plurality of liquids and selecting a second coordinate location in the whiteboard area update the display to show a graphical indication of the second liquid at the second coordinate location determine a first liquid blend recipe for a blend of the first liquid and the second liquid, wherein the proportions of the first liquid and the second liquid in the first liquid blend recipe are determined using an algorithm including as inputs the first coordinate location and the second coordinate location.

A method, apparatus, non-transitory computer readable medium, and system for customizable liquid blending and liquid dispensing system are described. One or more aspects of the method, apparatus, non-transitory computer readable medium, and system include dispensing, by a liquid dispensing system in communication with a liquid blending system, the liquid dispensing system including at least two different liquids of a type of liquid, of a liquid serving, where the liquid serving consists of one liquid or a blend of one or more of the at least two different liquids; storing data describing the liquid serving in a database coupled to the liquid blending system; receiving, via a user input interface of the liquid dispensing system, user input regarding the liquid serving; associating, by the liquid blending system, of the user input for the liquid serving with the data describing the liquid serving; determining, by the liquid blending system, of at least one new liquid blend recipe, wherein the at least one new liquid blend recipe is determined using at least a portion of the user input for the liquid serving; dispensing by the liquid dispensing system of a subsequent liquid serving according to one of the at least one new liquid blend recipe; and storing data describing the subsequent liquid serving and its blend recipe in the database coupled to the liquid blending system.

DETAILED DESCRIPTION

Figure 1:
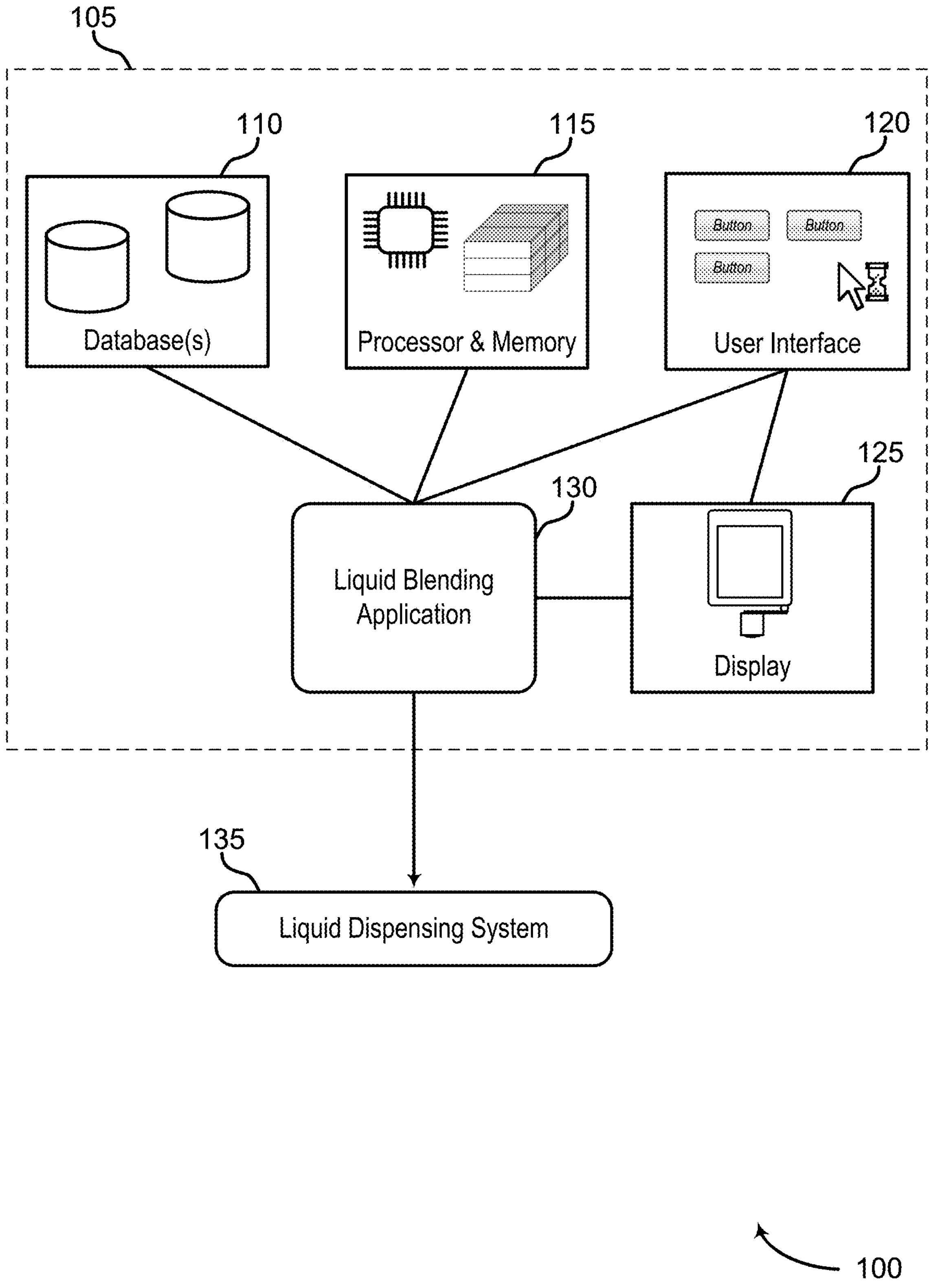
FIGS. 1 through 5 show examples of a liquid system according to one or more aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Consumable liquids (e.g., beverages) may be utilized or ingested (e.g., by humans, animals, etc.) for hydration, for sustenance, to satisfy thirst, for various cultural activities, etc. Moreover, some consumable liquids may be highly commercialized and are often met with high market demand. However, due to the extensive availability of liquid options and various levels of complexity associated with different available liquid options, many users/consumers may select a liquid (e.g., such as wine) based on labeling of the liquid or based on relying on other advice from experts, reviews, sellers, etc.

As for expert advice (e.g., guidance/advice from a sommelier, a brewmaster, etc.), in most to all circumstances, liquid consumers cannot explain their preferences (e.g., personal taste, smell, etc.) in a reliable manner. As a result, guidance and recommendations based on personal preferences, or based on perception of the consumer's preferences, may be ineffective or otherwise insufficient. Moreover, in some cases, guidance and recommendations may come from individuals (e.g., "experts") with various biases, for example, due to pressure from management to sell a liquid that isn't moving off of shelves, due to incentivizing by management or suppliers, etc.

In various aspects, liquid selection by an arbitrary user is often hit or miss in many scenarios. As described above, one example of a reason for inefficient liquid selection by a user includes the user relying on external information such as product labeling or product information, review or someone else's personal preferences, etc. (e.g., as wine consumers may often be told what to drink by an expert that may or may not have the same taste in wine).

In some examples, restaurants, bars, and other on-premises establishments may sell consumable liquids in different quantities to users/consumers (e.g., such as wines by the glass and wine by the bottle to patrons of such establishments). In some aspects, some sell techniques (e.g., "by the glass" programs) may have the potential to be very profitable but spoilage and shrinkage may erode margins. Another financial burden may include carrying a wide enough selection of wines to satisfy a range of customers' tastes.

In the wine industry, wine blending may include the creation and/or combination of a variety of wine styles (e.g., each at a range of quality levels) that may manifest the winery's brand identity and connect with their customers' taste and image of that winery. As such, wine blending that is appealing and desirable to consumers may be essential to a winery's success. In many cases, the difference between a sold-out (e.g., "critically acclaimed") liquid and deep discounted (e.g., clearance aisle bomb) liquid, may be a result of one or more aspects of wine blending techniques (e.g., where certain blends are highly desirable and other blends may be less desirable or may be catered towards a lower price point).

In some aspects, despite such importance of wine blending, wine blending has evolved little over the last 100 years. At most wineries, the winemaking staff may obtain samples of each wine lot from the winery. In some cases, as wineries may have many lots (e.g., over 100 lots), even this first step can be onerous. A winemaker may then taste the different lots and come up with preliminary blends. Winemaker staff may then prepare samples of the preliminary blends (e.g., using a graduated cylinder to measure out the volumes of each lot component). As a winemaker tastes through the blends, a winemaker may refine the percentages of lots in a blend (e.g., and a winemaker and/or staff may prepare the new blends accordingly). This iterative process may be repeated many times (e.g., dozens of times, and sometimes more). In some cases (e.g., once a winemaker has narrowed down a blend to 3 to 5 options), a winemaker may generally have staff get new samples and set up a tasting to get feedback from ownership.

With some wineries having several (e.g., over 10) different wine brands, the staff may prepare numerous (e.g., over 500) wine blend samples. In some cases, due to the tedious nature and complexity of such processes, staff may inadvertently mislabel samples, mismeasure wine components, etc. In some cases, such errors may lead to redoing blends (e.g., re-blending) if a winemaker catches it or a winemaker may make a final decision based on the wrong wine blend. For a winemaker, the sheer volume of wine blends can lead to confusion when referring back to notes.

Even if a winemaker and their staff do not make mistakes, the onus of accuracy and good record keeping while creating and tasting all of these blends can be overwhelming and so time-consuming that winemaking staff rarely like to blend more than 1 to 2 times per year. This focus on blending 1 to 2 times per year may create additional problems. For example, since blends are made specifically for these blending trials, a winemaker (e.g., and owner) may feel obligated to make final blending decisions during these infrequent cram sessions, despite the fact that inspiration for the perfect blend may not come during them.

One or more aspects of the present disclosure provide improved liquid systems, as well as improved liquid system techniques. For example, a liquid system may include a liquid blending system and a liquid dispensing system that more efficiently meets the demands of consumers/users. Specifically, liquid blending and dispensing systems described herein may facilitate user blending of various liquids, accurate user identification of sensory characteristics associated with various liquid blends and liquid blend components, efficient handling of user feedback and refinement of subsequent liquid blends, etc.

For instance, a liquid blending system may take user input and provide (e.g., blend and dispense) a liquid serving to a receptacle. The liquid system may store data describing the liquid serving in a database coupled to the liquid blending system. Further, the liquid system may receive and analyze user input regarding the liquid serving (e.g., such as user opinions on sensory characteristics of the liquid serving). Then, based on the user input, provide at least one new liquid blend recipe and dispense a subsequent liquid serving (e.g., according to the at least one new liquid blend recipe). In some aspects, the liquid system may store data describing the subsequent liquid serving and its blend recipe in the database coupled to the liquid blending system.

Various aspects of the techniques and systems described herein are now described in detail below with reference to exemplary embodiments of FIGS. 1-24. While some embodiments of the present disclosure may be described with reference to liquids (e.g., such as beverages, and more specifically to wines), it should be understood that the systems and techniques described herein are not limited thereto. One or more aspects of the systems and techniques described herein may be applied to any category of blendable and/or dispensable substances by analogy, without departing from the scope of the present disclosure. For instance, systems and techniques described herein may be applied to any category of blendable and/or dispensable substances which have intrinsic chemical and/or sensory characteristics.

FIG. 1 shows an example of a liquid system 100 according to aspects of the present disclosure. Liquid system 100 is an example of, or includes aspects of, the corresponding element described with reference to FIGS. 2-5. In one aspect, liquid system 100 includes liquid blending system 105 and liquid dispensing system 135. Liquid blending system 105 is an example of, or includes aspects of, the corresponding element described with reference to FIGS. 2-5. In one aspect, liquid blending system 105 includes database 110, processor and memory 115, user interface 120, display 125, and liquid blending application 130. In some aspects, liquid dispensing system 135 is an example of, or includes aspects of, the corresponding element described with reference to FIGS. 2-5.

Referring to FIG. 1, a schematic embodiment of a local liquid blending system 105 is shown. Shown are a processor and memory 115 (e.g., a processor and non-transitory memory), a liquid blending application 130 configured to run on the processor, a plurality of databases 110 in communication with the liquid blending application 130, a user interface 120 coupled to the liquid blending application 130, and a display 125 coupled to the user interface 120 and the liquid blending application 130. The local liquid blending application 130 may be in operative communication with a liquid dispensing system 135.

Systems and techniques for liquid blending and dispensing are described. For example, methods according to the present disclosure may include: dispensing, by a liquid dispensing system 135 in communication with a liquid blending system 105, the liquid dispensing system 135 including at least two different liquids of a type of liquid, of a liquid serving, where the liquid serving consists of one liquid or a blend of one or more of the at least two different liquids; and storing data describing the liquid serving in a database 110 coupled to the liquid blending system 105. Moreover, methods according to the present disclosure may include receiving, via a user input interface of the liquid dispensing system 135, user input regarding the liquid serving; associating, by the liquid blending system 105, of the user input for the liquid serving with the data describing the liquid serving; and determining, by the liquid blending system 105, of at least one new liquid blend recipe, wherein the at least one new liquid blend recipe is determined using at least a portion of the user input for the liquid serving. Moreover, methods according to the present disclosure may include dispensing by the liquid dispensing system 135 of a subsequent liquid serving according to one of the at least one new liquid blend recipe and storing data describing the subsequent liquid serving and its blend recipe in the database 110 coupled to the liquid blending system 105.

In some examples, methods may further include: receiving, via the user input interface of the liquid dispensing system 135, user input regarding the subsequent liquid serving; and associating, by the liquid blending system 105, of the user input for the subsequent liquid serving with the data describing the subsequent liquid serving.

In some examples, methods may further include: determining, by the liquid blending system 105, of a final liquid blend recipe, wherein the final liquid blend recipe is determined using at least a portion of the user input for the subsequent liquid serving. In some examples, methods may further include: dispensing by the liquid dispensing system 135 of a final liquid serving according to the final liquid blend recipe; and storing data describing the final liquid serving and its blend recipe in the database 110 coupled to the liquid blending system 105.

Moreover, according to the present disclosure, liquid systems 100 (e.g., one or more systems for liquid blending and/or liquid dispensing) are described. In some aspects, liquid systems 100 may include, or refer to, a liquid blending system 105, a liquid dispensing system 135, or both.

For instance, a liquid blending system 105 may include: at least one liquid database 110 including data for each of a plurality of liquids; at least one user database 110 including data for each of a plurality of users; a computing device including a processor and non-transitory memory; a liquid blending application 130 configured to run on the computing device, the liquid blending application 130 in communication with the at least one liquid database 110 and the at least one user database 110; a user interface 120 in communication with the liquid blending application 130 and configured to receive input from a user; and a display 125 in communication with the liquid blending application 130.

In various aspects, the liquid blending system 105 may be configured to: display 125, on the display 125, a whiteboard area defining a workspace for liquid blend manipulation and a graphical indication of each of a plurality of liquids; receive a first liquid selection input from a user of the plurality of users, wherein the first liquid selection input includes selecting a first liquid of the plurality of liquids and selecting a first coordinate location in the whiteboard area; and update the display 125 to show a graphical indication of the first liquid at the first coordinate location.

Further, the liquid blending system 105 may be configured to: receive a second liquid selection input from the user, wherein the second liquid selection input includes selecting a second liquid of the plurality of liquids and selecting a second coordinate location in the whiteboard area; update the display 125 to show a graphical indication of the second liquid at the second coordinate location; and determine a first liquid blend recipe for a blend of the first liquid and the second liquid. In some aspects, the proportions of the first liquid and the second liquid in the first liquid blend recipe are determined using an algorithm including as inputs the first coordinate location and the second coordinate location.

Liquid systems 100 may further include liquid dispensing systems 135. For example, a liquid dispensing system 135 may be in communication with a liquid blending system 105 (e.g., within a liquid system 100). In some aspects, the liquid dispensing system 135 may be fluidly coupled to the first liquid and the second liquid for dispensing blends of the first liquid and the second liquid. As described herein, the liquid dispensing system 135 may be configured to: receive from the computing device an instruction to dispense a first liquid serving according to the first liquid blend recipe; and dispense the first liquid serving.

A processor (e.g., which may refer to, or may be included in, be included in processor and memory 115) is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing. In some aspects, processor and memory 115 is an example of, or includes aspects of, the corresponding element described with reference to FIG. 2.

Examples of a memory device (e.g., which may refer to, or may be included in, be included in processor and memory 115) include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

A database 110 is an organized collection of data. For example, a database 110 stores data in a specified format known as a schema. A database 110 may be structured as a single database 110, a distributed database 110, multiple distributed databases 110, or an emergency backup database 110. In some cases, a database 110 controller may manage data storage and processing in a database 110. In some cases, a user interacts with database 110 controller. In other cases, database 110 controller may operate automatically without user interaction. In some aspects, database 110 is an example of, or includes aspects of, the corresponding element described with reference to FIG. 2.

A user interface 120 may enable a user to interact with a device. In some embodiments, the user interface 120 may include an audio device, such as an external speaker system, an external display 125 device such as a display 125 screen, or an input device (e.g., remote control device interfaced with the user interface 120 directly or through an IO controller module). In some cases, a user interface 120 may be a graphical user interface 120 (GUI). In some aspects, user interface 120 is an example of, or includes aspects of, the corresponding element described with reference to FIG. 2.

A display 125 may comprise a conventional monitor, a monitor coupled with an integrated display 125, an integrated display 125 (e.g., an LCD display 125), or other means for viewing associated data or processing information. Output devices other than the display 125 can be used, such as printers, other computers or data storage devices, and computer networks. In some aspects, display 125 is an example of, or includes aspects of, the corresponding element described with reference to FIGS. 2, and 5-20.

In some cases, one or more aspects of the present disclosure may be implemented via software. For instance, liquid blending application 130 may include, or may refer to, software and/or hardware for implementing one or more aspects of techniques described herein. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein. In some aspects, liquid blending application 130 is an example of, or includes aspects of, the corresponding element described with reference to FIG. 2.

Figure 2:
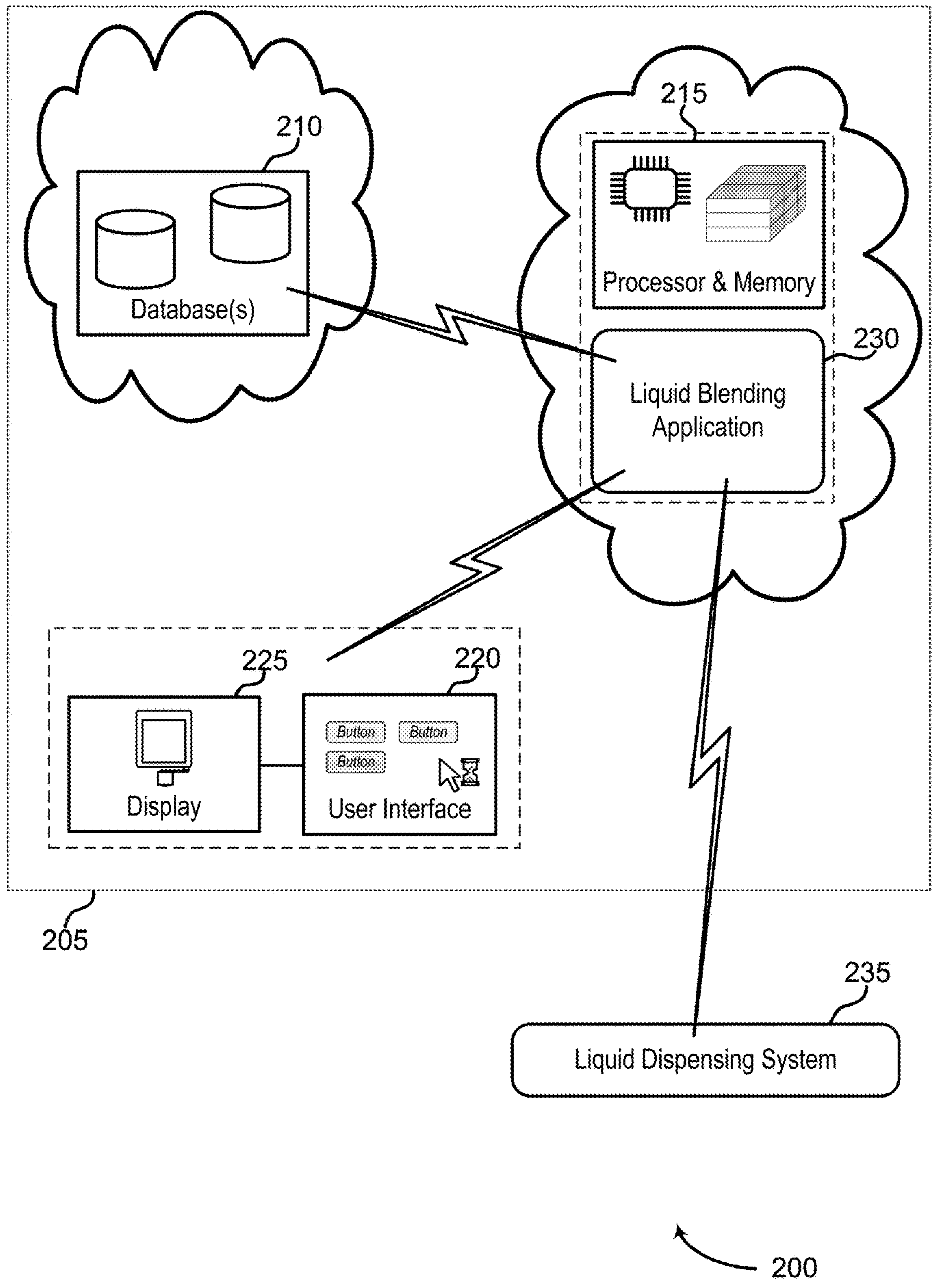

FIG. 2 shows an example of a liquid system 200 according to aspects of the present disclosure. Liquid system 200 is an example of, or includes aspects of, the corresponding element described with reference to FIGS. 1, and 3-5. In one aspect, liquid system 200 includes liquid blending system 205 and liquid dispensing system 235. In one aspect, liquid blending system 205 includes database 210, processor and memory 215, user interface 220, display 225, and liquid blending application 230.

In the example of FIG. 2, a schematic embodiment of a network liquid blending system 205 is shown. In this embodiment, the processor and memory 215, the liquid blending application 230, and the plurality of databases 210 may all be in the cloud. The display 225 and the user interface 220 may be in communication with the liquid blending application 230 (e.g., via a wired connection, a wireless connection, the internet, etc.). In some aspects, the network liquid dispensing system 235 may also be in communication with the liquid blending application 230 via the internet.

Liquid blending system 205 is an example of, or includes aspects of, the corresponding element described with reference to FIGS. 1, and 3-5. Database 210 is an example of, or includes aspects of, the corresponding element described with reference to FIG. 1. Processor and memory 215 is an example of, or includes aspects of, the corresponding element described with reference to FIG. 1. User interface 220 is an example of, or includes aspects of, the corresponding element described with reference to FIG. 1. Display 225 is an example of, or includes aspects of, the corresponding element described with reference to FIGS. 1, and 5-20. Liquid blending application 230 is an example of, or includes aspects of, the corresponding element described with reference to FIG. 1. Liquid dispensing system 235 is an example of, or includes aspects of, the corresponding element described with reference to FIGS. 1, and 3-5.

Figure 3:
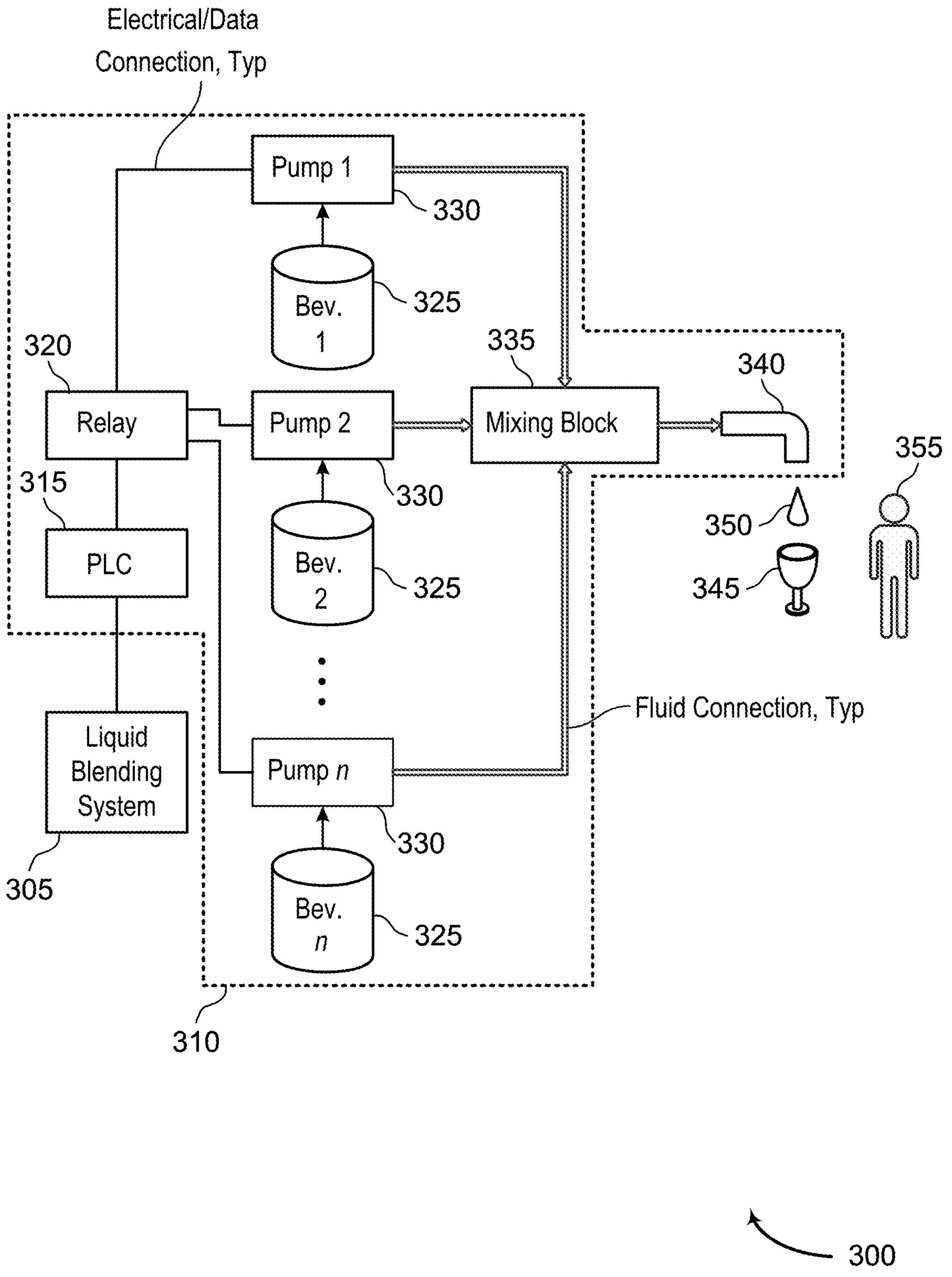

FIG. 3 shows an example of a liquid system 300 according to aspects of the present disclosure. Liquid system 300 is an example of, or includes aspects of, the corresponding element described with reference to FIGS. 1, 2, 4, and 5. In one aspect, liquid system 300 includes liquid blending system 305, liquid dispensing system 310, receptacle 345, blended liquid 350, and user 355. In one aspect, liquid dispensing system 310 includes PLC 315, relay 320, containers 325, pumps 330, mixing block 335, and nozzle 340.

In the example of FIG. 3, a first embodiment of the liquid dispensing system 310 is shown. The liquid dispensing system 310 (e.g., shown in FIG. 3 schematically), may be coupled to a programmable logic controller (PLC 315) which sends commands to the relay 320. The relay 320 is coupled to the plurality of pumps 330. Each pump is fluidly coupled to one of a plurality of containers 325, each container holding a different liquid, and to a mixing box such that each pump, as directed by the relay 320, pumps 330 a specific portion of that liquid from the container to the mixing block 335. The mixing block 335 receives each liquid portion, blends the portions, and sends the blended liquid 350 (e.g., the blended beverage) to a nozzle 340, where the blended liquid 350 is dispensed to the user 355 (e.g., the blended beverage is dispensed to the user 355 for consumption).

The liquid blending application, as well as controlling the liquid blending and liquid dispensing processes, also provides for administrative access to the databases and direct control of the dispensing system. For example, pump number and digital or analog inputs to the programmable logic controller can be directly edited. The liquid blending application may also include a user 355 interface for calibration of the system.

The databases include data for all aspects of the system, including user 355 data, liquid data (e.g., beverage data), blending data, equipment data, second-order data (i.e. deep learning results), operational/dispensing data, etc.

Accordingly, liquid dispensing system 310 may include a PLC 315, at least two containers 325, and at least one pump. The PLCE may be configured to receive from the liquid blending system 305 the instruction to dispense the first liquid serving according to the first liquid blend recipe. Each container of the at least two containers 325 may hold a liquid, and a first container of the at least two containers 325 holds the first liquid and a second container of the at least two containers 325 holds the second liquid. Further, each pump of the at least one pump may be communicatively coupled to the computing device and fluidly coupled to one of the at least two containers 325.

Further, liquid dispensing system 310 may include a mixing block 335 and a nozzle 340. The mixing block 335 may be fluidly coupled to each container via the corresponding pump and configured to receive a first amount of the first liquid and a second amount of the second liquid according to the first liquid blend recipe and mix the liquid amounts to create the first liquid serving. In some aspects, each pump is further configured to pump the liquid amounts to the mixing block 335 in response to receiving an instruction via the computing device for pumping the designated amount of the corresponding liquid. The nozzle 340 may be fluidly coupled to the mixing block 335 and configured to dispense the first liquid serving.

In some aspects, liquid dispensing system 310 may further include a PLC 315 communicatively interposed between the computing device and each pump. In some aspects, liquid dispensing system 310 may include a relay 320 communicatively interposed between the PLC 315 and each pump.

Liquid blending system 305 is an example of, or includes aspects of, the corresponding element described with reference to FIGS. 1, 2, 4, and 5. Liquid dispensing system 310 is an example of, or includes aspects of, the corresponding element described with reference to FIGS. 1, 2, 4, and 5. PLC 315, relay 320, containers 325, mixing block 335, nozzle 340, receptacle 345, blended liquid 350, and user 355 are each examples of, or each include aspects of, the corresponding elements described herein (e.g., with reference to FIG. 4).

Figure 4:
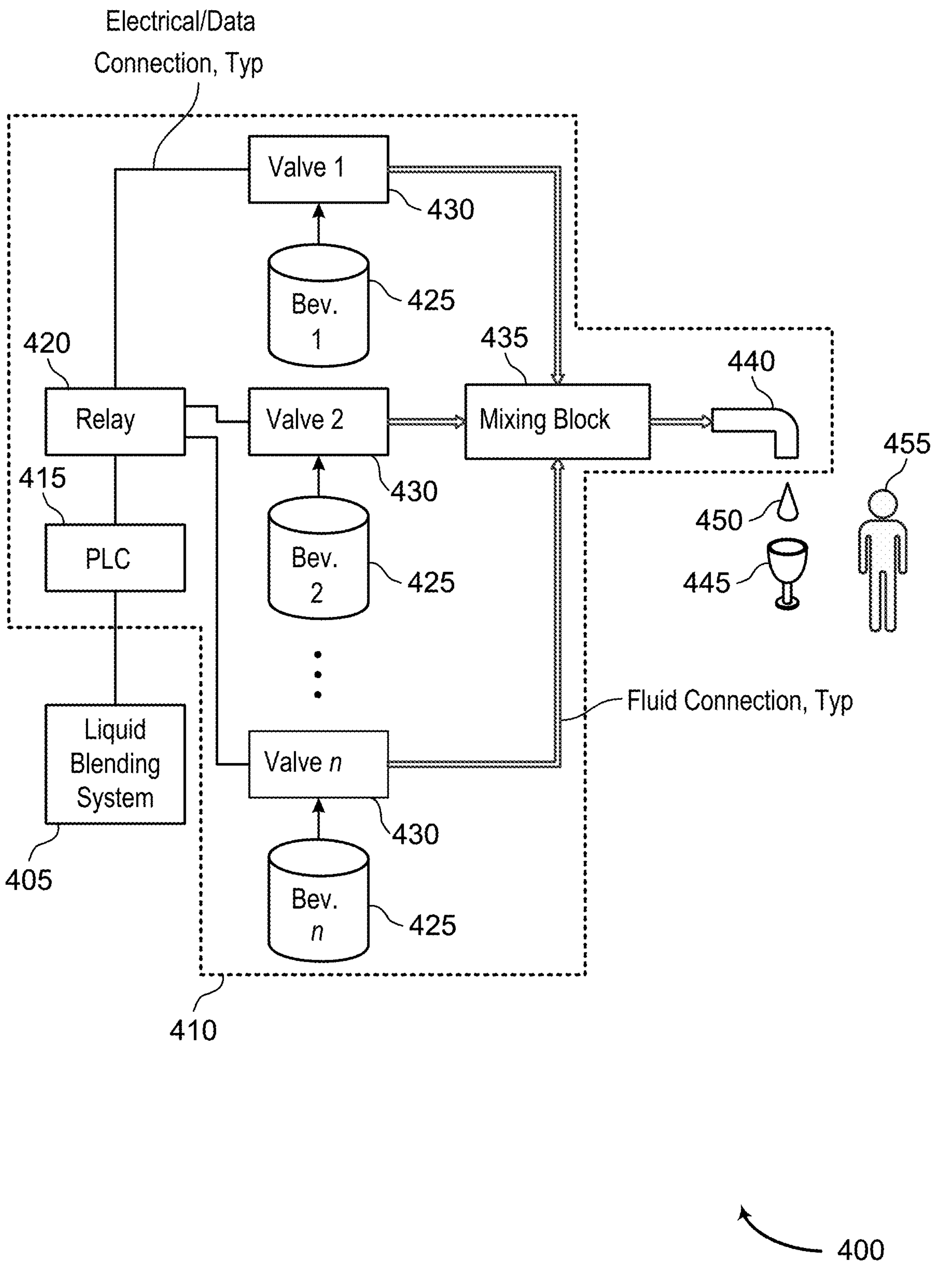

FIG. 4 shows an example of a liquid system 400 according to aspects of the present disclosure. Liquid system 400 is an example of, or includes aspects of, the corresponding element described with reference to FIGS. 1-3, and 5. In one aspect, liquid system 400 includes liquid blending system 405, liquid dispensing system 410, receptacle 445, blended liquid 450, and user 455. In one aspect, liquid dispensing system 410 includes PLC 415, relay 420, containers 425, valves 430, mixing block 435, and nozzle 440.

In the example of FIG. 4, another embodiment of the liquid dispensing system 410 is shown. In the embodiment of FIG. 4, at least one valve may connect each liquid container to the mixing block 435. In this embodiment each container may be pressurized such that the corresponding liquid is automatically sent to the mixing block 435 when the relay 420 opens the valve.

Another example liquid dispensing system 410 according to the present disclosure may include a PLC 415, at least two containers 425, at least one valve, a mixing block 435, and a nozzle 440. In some cases, the PLC 415 may be configured to receive from the liquid blending system 405 the instruction to dispense the first liquid serving according to the first liquid blend recipe. Further, each container (e.g., of the at least two containers 425) holds a liquid. In some aspects, a first container of the at least two containers 425 holds the first liquid and a second container of the at least two containers 425 holds the second liquid, where each container is pressurized by a compressed inert gas. Each valve of the liquid dispensing system 410 may be communicatively coupled to the liquid blending system 405 and fluidly coupled to one of the at least two containers 425. In some aspects, the liquid in the corresponding pressurized container flows through the valve when the valve is open. The mixing block 435 of the liquid dispensing system 410 may be fluidly coupled to each container via the corresponding valve, and the mixing block 435 may be configured to receive a first amount of the first liquid and a second amount of the second liquid according to the first liquid blend recipe and mix the liquid amounts to create the first liquid serving. In some aspects, each valve may be further configured to open for a certain amount of time in response to receiving an instruction via the computing device for conveying the designated amount of the corresponding liquid. Additionally, the nozzle 440 may be fluidly coupled to the mixing block 435 and configured to dispense the first liquid serving.

Liquid blending system 405 is an example of, or includes aspects of, the corresponding element described with reference to FIGS. 1-3, and 5. Liquid dispensing system 410 is an example of, or includes aspects of, the corresponding element described with reference to FIGS. 1-3, and 5. PLC 415, relay 420, containers 425, mixing block 435, nozzle 440, receptacle 445, blended liquid 450, and user 455 are each examples of, or each include aspects of, the corresponding elements described herein (e.g., with reference to FIG. 3).

Figure 5:
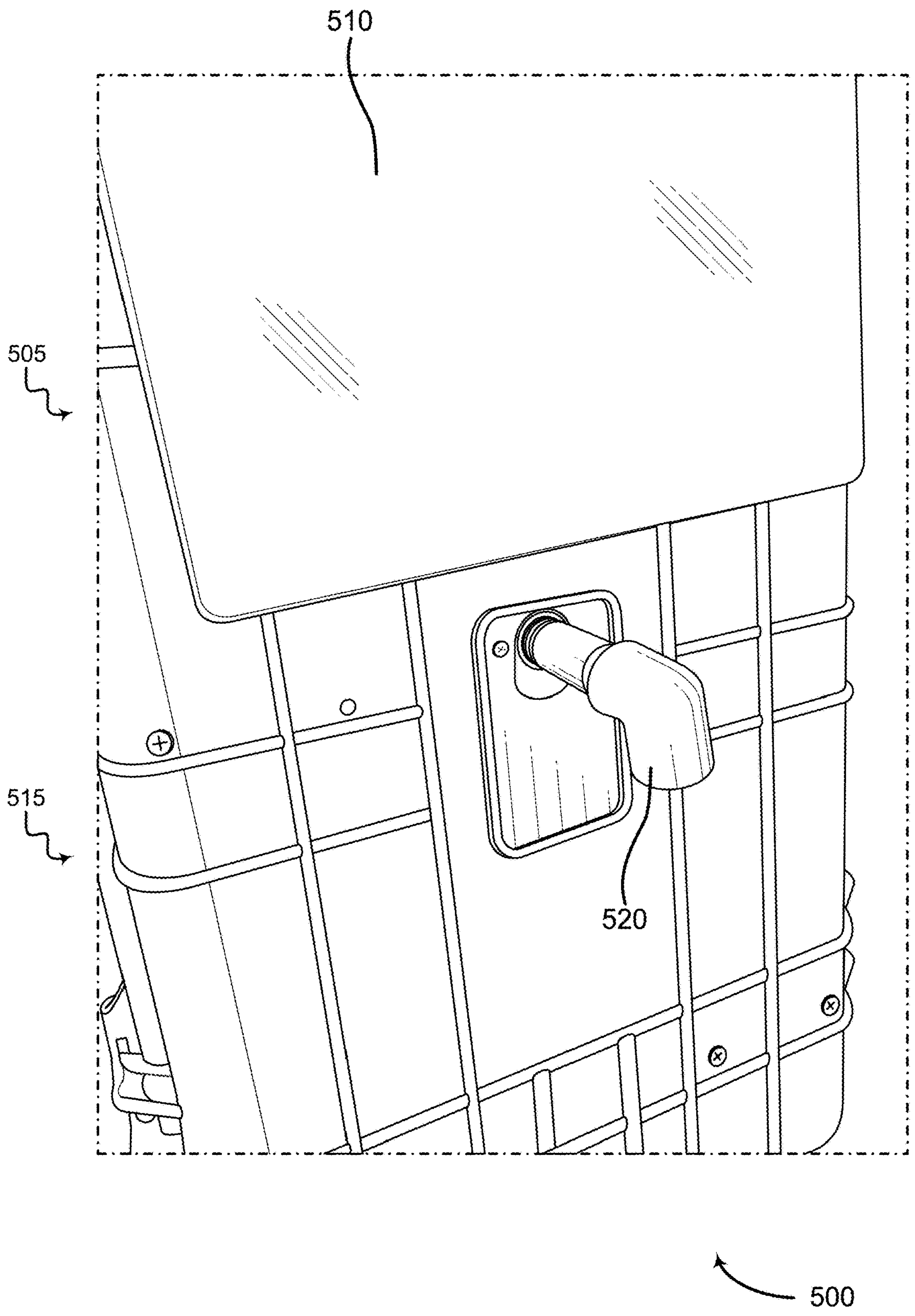

FIG. 5 shows an example of a liquid system 500 according to aspects of the present disclosure. Liquid system 500 is an example of, or includes aspects of, the corresponding element described with reference to FIGS. 1-4. In one aspect, liquid system 500 includes liquid blending system 505 and liquid dispensing system 515. In one aspect, liquid blending system 505 includes display 510. In one aspect, liquid dispensing system 515 includes nozzle 520.

In the example of FIG. 5, a dispensing station is shown (e.g., a dispensing station of a liquid system 500). The nozzle 520 of the dispensing system is housed in the housing (e.g., a housing of a liquid dispensing system 515) and the nozzle 520 may extend through a side of the housing such that the blended liquid may be dispensed outside the housing. In one example, a touchscreen display 510 may be coupled to a same side of the housing. The touchscreen display 510 may serve as both the user interface and the display 510 of the liquid blending system 505. In some embodiments, the touchscreen display 510 may include a tablet computing device. In some embodiments, the liquid blending system 505 (e.g., including the touchscreen display 510, behind the touch screen display 510, etc.) may include one or more of the processor, the memory (e.g., non-transitory memory), and at least one database of the liquid blending system 505.

Liquid blending system 505 is an example of, or includes aspects of, the corresponding element described with reference to FIGS. 1-4. Display 510 is an example of, or includes aspects of, the corresponding element described with reference to FIGS. 1, 2, and 6-20. Liquid dispensing system 515 is an example of, or includes aspects of, the corresponding element described with reference to FIGS. 1-4. Nozzle 520 is an example of, or includes aspects of, the corresponding element described with reference to FIGS. 3 and 4.

Figure 6:
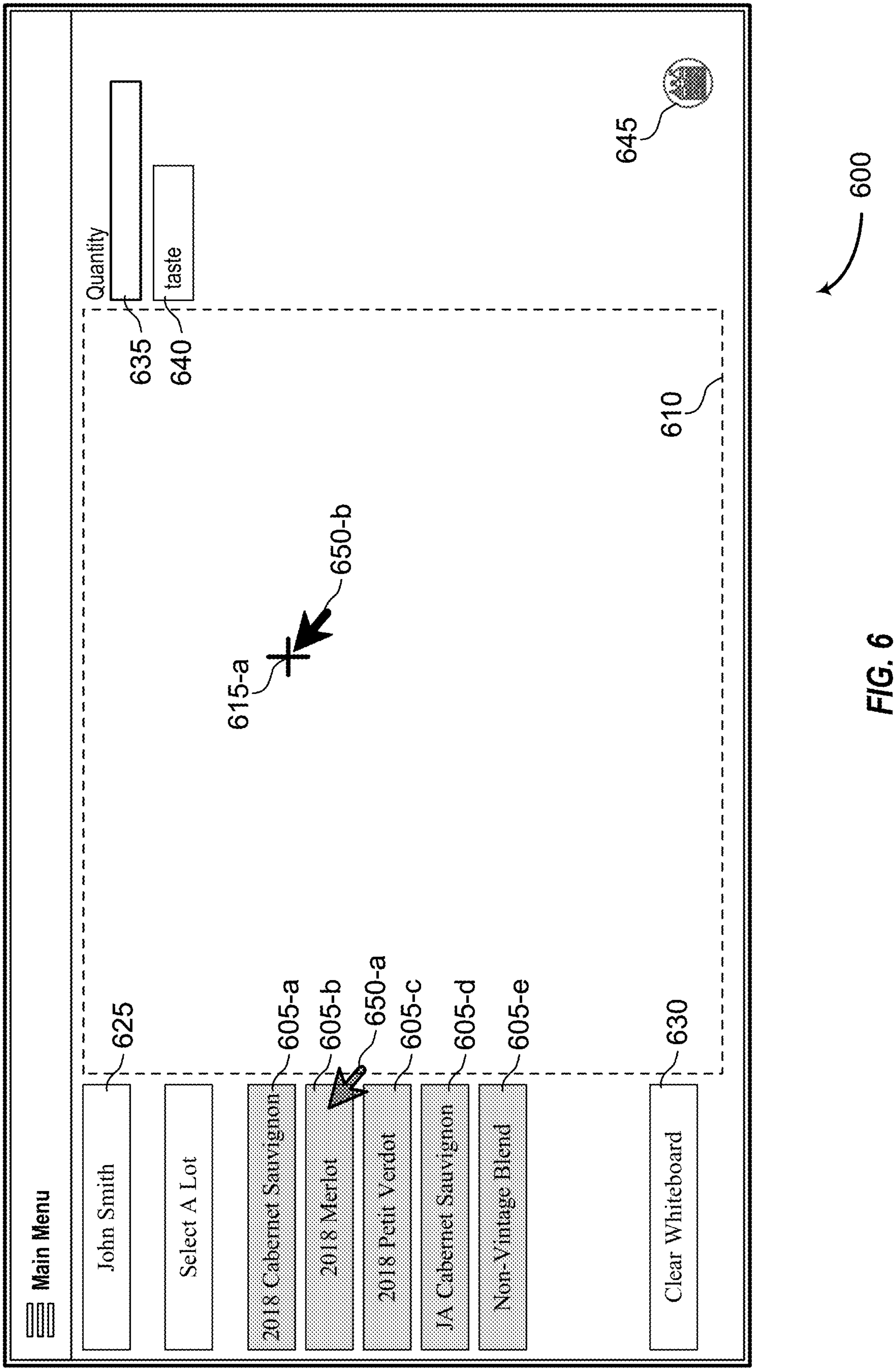
FIGS. 6 through 20 show exemplary screen displays of liquid blending systems according to one or more aspects of the present disclosure.

FIG. 6 shows an example of an exemplary screen display 600 by a liquid blending system according to aspects of the present disclosure. Display 600 (e.g., an example display screen 600, which may be displayed via a display of a liquid system as described herein, for example, with reference to FIGS. 1, 2, and 5) is an example of, or includes aspects of, the corresponding element described with reference to FIGS. 1, 2, 5, and 7-20. In one aspect, display 600 includes liquid selection inputs 605, whiteboard area 610, coordinate locations 615, user account icon 625, clear whiteboard icon 630, quantity icon 635, taste icon 640, action icon 645, and selections 650.

In the example of FIG. 6, an exemplary display 600 screen of a liquid blending system is shown at a first point in time. For instance, the display 600 screen of FIG. 6 may illustrate and example of what may be displayed on a display of a liquid blending system. The display 600 screen shows the liquid blending user interface as a user initiates a liquid blending process. The display 600 screen displays a number of graphical indications for information for the user or for selection 650 for various actions. In some cases, the various graphical indications may include or may be referred to as icons.

Generally, the graphical indications displayed on the display 600 screen may be selectable by the user for providing user input.

In the exemplary display 600 screen of FIG. 6, on a left side of the display 600 screen a plurality of liquid selection inputs 605 (e.g., liquid graphical indications each representing a corresponding liquid) are shown, each of which is selectable by the user (e.g., a user may select a liquid selection input 605 corresponding to a desired liquid or beverage). In some examples, the plurality of liquid selection inputs 605 may also be referred to as a wine column. In some embodiments, the scrolling, selectable liquid selection inputs 605 (a scrolling, selectable wine column) are organized or arranged as a dynamically generated column of the liquids (e.g., wine lots) available for blending and dispensing.

A user account icon 625 (e.g., a user account graphical indication) on the display 600 screen shows the name of the current user account and the user account icon 625 may be selectable to change the current user account. In some embodiments the user account icon 625 comprises a button that when pressed brings the user to the "People" screen. Once there, the user has the option of creating a new profile, using their existing profile or editing their existing profile.

A clear whiteboard icon 630 may be selectable by the user to clear all selections 650 on a whiteboard area 610 and any other graphical indications of the blend (e.g., such as recipe graphical indications). On the right side of the exemplary display 600 screen a taste icon 640 is selectable by the user to initiate the process for dispensing one or more liquids. An action icon 645 is selectable by the user to initiate additional actions, such as saving the current liquid blend, etc. (e.g., as described in more detail herein, for example, with reference to FIGS. 13-15). A quantity icon 635 indicates that the user is able to input a quantity for the liquid. The user may adjust the amount of blended wine dispensed by manually entering the quantity, by selecting a quantity from a scroll box with default quantities (e.g., taste, glass, bottle), etc.

Referring to FIGS. 6-13, one or more aspects of systems and techniques for liquid blending and liquid dispensing according to the present disclosure are described. For instance, aspects of FIGS. 6-13 may illustrate and describe one or more example embodiments of user interaction with a liquid system (e.g., user interaction with a user interface of a liquid blending system), one or more example embodiments of data storage and liquid blending (e.g., by a liquid blending system), one or more example embodiments of liquid dispensing (e.g., by a liquid blending system), one or more example embodiments of user feedback of dispensed/analyzed blended liquids, and one or more example embodiments of user feedback management (e.g., by the liquid blending system), etc.

For instance, FIGS. 6-13 may illustrate user selection of liquid selection inputs 605-*b*, 605-*c*, 605-*d*, and 605-*a* (e.g., respectively) for liquid blending (e.g., and for subsequent dispensing of the blended liquid). Further, FIGS. 6-13 may illustrate determination of recipe graphical indications 655 (e.g., based on user selection of liquid selection inputs 605), as well as modification (e.g., refinement) of blended liquid recipes (e.g., via selection and manipulation of coordinate locations 615 on a whiteboard area 610 of a display, by a user of a liquid system). Moreover, FIGS. 14 and 15 may illustrate additional exemplary details for how a liquid system (e.g., a user of a liquid system) may modify/refine blended liquid recipes (e.g., how a liquid system/user may modify the ingredients in a combination of liquid selections, modify percentages of liquids in a combination of liquid selections, etc.).

One or more aspects of such systems and techniques that are enabled by the present disclosure are described in more detail herein.

For instance, in the example of FIGS. 6-13, a whiteboard area 610 may be located in the middle of a display screen (e.g., in the middle of display screens 600-1300). In some examples, the whiteboard area 610 may be a rectangular shape (e.g., analogous to a physical whiteboard).

Referring to FIG. 6 (e.g., to initiate the liquid blending process), a user may input a selection of a first liquid (e.g., a user may input liquid selection input 605-*b* via selection 650-*a*). In this example, the user input is shown as a selection arrow (e.g., selection 650-*a*) on the graphical indication of the first liquid (e.g., liquid selection input 605-*b*). Additionally, a first coordinate location (e.g., coordinate location 615-*a*) on the whiteboard area 610 may be selected (e.g., using user input) via selection 650-*b*. In some examples, the selection of the coordinate location 615-*a* (e.g., the selection 650-*b*) may be indicated by the crosshairs shown on the display screen 600 (e.g., in the whiteboard area 610). The first coordinate location 615-*a* is now associated with the first liquid (e.g., with the liquid represented by liquid selection input 605-*b*). In this example, the first liquid (e.g., the first beverage corresponding to liquid selection input 605-*b*) is indicated as “2018 Merlot”, also shown as “18 M”. In this example, the first coordinate location 615-*a* is somewhat in the center of the whiteboard area 610.

The user input (e.g., liquid selection input 605-*b* via selection 650-*a*, as well as selection of coordinate location 615-*a* via selection 650-*b*) sends the first liquid and the first coordinate location 615-*a* to the liquid blending application. The liquid blending system (e.g., the liquid blending application) may associate the first liquid with the first coordinate location 615-*a*, and the liquid blending system may create a blend recipe (e.g., recipe graphical indications 655, as described in more detail herein, for example, with reference to FIGS. 7-13). The liquid blending system (e.g., the liquid blending application) may also update the display screen based on the user input.

In some embodiments, the display screen of a liquid blending system or “Wine Whiteboard” User Interface comprises any number of sections (e.g., any number of user selectable options, icons, graphical indications, etc.). In some examples, the top section may include a main menu. The upper left section may include a user account graphical indicator button (e.g., a user account icon 625) to select, create, or modify a user profile. The middle left section may comprise a scrolling, selectable available wine lot column and a clear button (e.g., a clear whiteboard icon 630). The center portion of the screen comprises the whiteboard area 610 (e.g., which, in some examples, may include or refer to a “Wine Whiteboard”). The upper right section comprises the dispense quantity selector (e.g., a quantity icon 635). The middle right section may comprise a scrolling, active wine lot blend and percentage column. The bottom right section may comprise a menu (e.g., an action icon 645) for dispensing and saving existing blends and viewing past blend history.

In some embodiments, a Main Menu icon may quick access to user and wine lot information, the available user interfaces and administrative functions such as calibration. In some embodiments, functions accessed may include one or more of user account access, wine lot information, custom label generator, blend slider interfaces, guided blending, whiteboard (e.g. the current user interface), axis ranking, administrative functions, and calibration. In some embodiments, these functions may not be available to all users (some may be restricted to administrators or owners).

In some embodiments, the user account icon 625 may comprise a button (e.g., a selectable graphical indication) that when pressed brings the user to the “People” screen. Once there, the user has the option of creating a new profile, using their existing profile or editing their existing profile.

Figure 7:
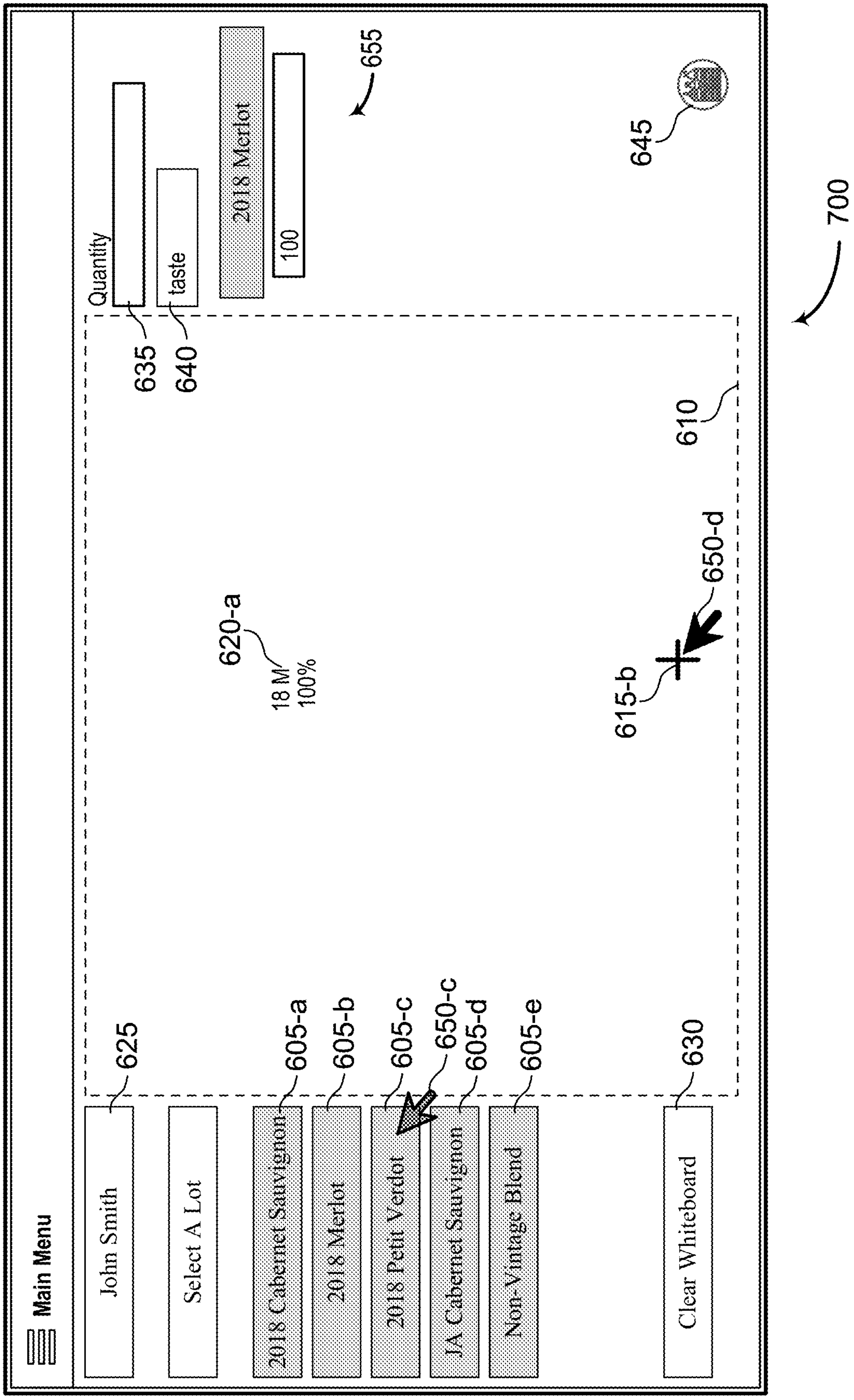

FIG. 7 shows an example of an exemplary screen display 700 by a liquid blending system according to aspects of the present disclosure. Display 700 (e.g., an example display screen 700, which may be displayed via a display of a liquid system as described herein, for example, with reference to FIGS. 1, 2, and 5) is an example of, or includes aspects of, the corresponding element described with reference to FIGS. 1, 2, 5, 6, and 8-20. In one aspect, display 700 includes liquid selection inputs 605, whiteboard area 610, coordinate locations 615, liquid selection graphical indications 620, user account icon 625, clear whiteboard icon 630, quantity icon 635, taste icon 640, action icon 645, selections 650, and recipe graphical indication 655.

In some aspects, the exemplary display screen 700 of a liquid blending system is shown at a second point in time in FIG. 7 (e.g., exemplary display screen 600 may illustrate a display screen at a first point in time, $t_1$, and exemplary display screen 700 may illustrate a display screen at a subsequent second point in time, $t_2$ (e.g., where $t_1<t_2$).

For instance, a liquid blending application may have received a user selection of the first liquid as the 2018 Merlot (e.g., via liquid selection input 605-*b*) and the first coordinate location 615-*a*. In the example of FIG. 7, the liquid system (e.g., the liquid blending application) may update the display screen 700 in real time to show a liquid selection graphical indication 720 (e.g., a graphical indication of the first liquid amount, which is a graphical indication of the amount of 2018 Merlot, in the present example). For instance, since there are no other liquids selected at this point, the percentage of the first liquid “2018 Merlot” is 100%. In other words, the liquid selection graphical indication 720 may be displayed, which may graphically represent or indicate the user input including the selected liquid selection input 605-*b* and the selected first coordinate location 615-*a*.

The current blend (e.g., a recipe graphical indication 655) is also shown in a tabular form on the right side of the whiteboard display screen and is updated in real time. The graphical indication of the first liquid is added to the recipe graphical indication 655, along with the number "100" to indicate that the blend (e.g., the recipe) includes 100% of the 2018 merlot.

Additional liquids may be added at any time and in any order. As liquids (e.g., wine lots) are added and/or their coordinate locations in the whiteboard area are changed, the liquid blending application receives the information from the user interface and updates the blend recipe in real time (e.g., the recipe graphical indication 655 is updated based on user input including selection of liquid selection inputs 605, selection/manipulation of coordinate locations 615, etc.). As used herein, a recipe (e.g., a blend recipe, liquid blend recipe, beverage recipe, etc.) may refer to any parameters, details, etc. pertaining to a concoction (e.g., a concoction of liquids, beverages, wines, etc.). For example, a recipe may include a set of instructions for preparing a particular liquid blend (e.g., such as blend of wines). A recipe may refer to (or may include) one or more lists of ingredients (e.g., liquids), percentages of each ingredient (e.g., percentages of each liquid in the recipe/blend), weight or volume of each ingredient (e.g., weight or volume of each liquid in the recipe/blend), etc.

In the example of FIG. 7, a user selection of a second liquid and a second coordinate location is shown. In the example shown, the user has selected "2018 Petit Verdot", also shown as "18 PV". For instance, second user input may include input of liquid selection input 605-*c* via selection 650-*c* and input of coordinate location 615-*b* via selection 650-*d*. In the present example, the exemplary second coordinate location 615-*b* may have a similar x-axis value to the first coordinate location 615-*a*, but coordinate location 615-*b* may have a y-axis value considerably smaller than that of the first coordinate location 615-*a*. The user input (e.g., selection 650-*c* and/or selection 650-*d*) sends the second liquid (e.g., 2018 PV corresponding to liquid selection input 605-*c*) and the second coordinate location (e.g., coordinate location 615-*b*) to the liquid blending application. Then, a liquid blending application may associate the second liquid with the second coordinate location, calculate an updated blend recipe based at least in part on the coordinate locations of the liquids, and update the display screen based on the updated blend recipe (e.g., to display an updated recipe graphical indication 655, as shown in the example of FIG. 8).

Figure 8:
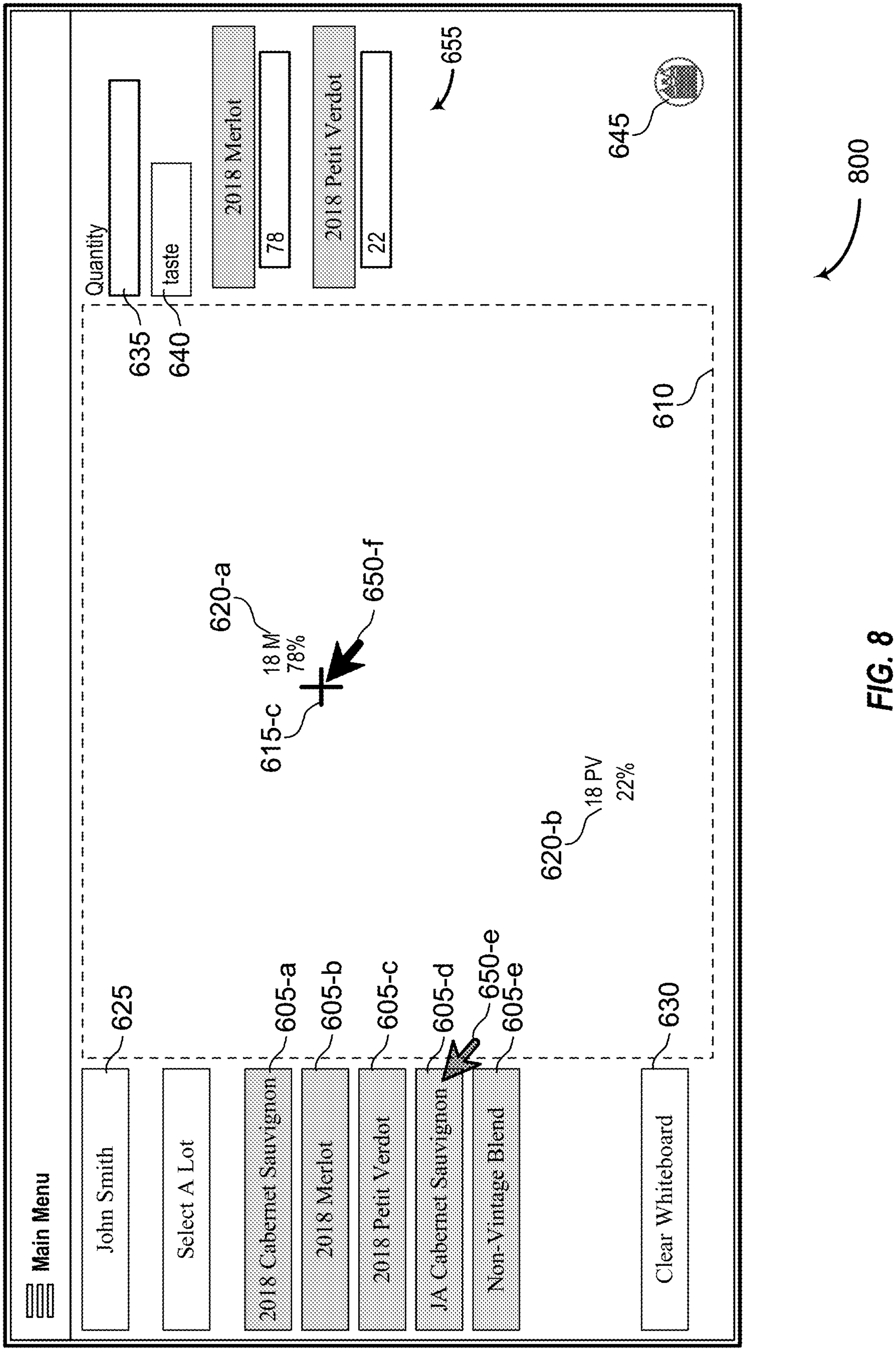

FIG. 8 shows an example of an exemplary screen display 800 by a liquid blending system according to aspects of the present disclosure. Display 800 (e.g., an example display screen 800, which may be displayed via a display of a liquid system as described herein, for example, with reference to FIGS. 1, 2, and 5) is an example of, or includes aspects of, the corresponding element described with reference to FIGS. 1, 2, 5-7, and 9-20. In one aspect, display 800 includes liquid selection inputs 605, whiteboard area 610, coordinate locations 615, liquid selection graphical indications 620, user account icon 625, clear whiteboard icon 630, quantity icon 635, taste icon 640, action icon 645, selections 650, and recipe graphical indication 655.

In some aspects, the exemplary display screen 800 of a liquid blending system is shown at a third point in time in FIG. 8. For example, exemplary display screen 600 may illustrate a display screen at a first point in time, $t_1$, exemplary display screen 700 may illustrate a display screen at a subsequent second point in time, $t_2$, and exemplary display screen 800 may illustrate a display screen at a subsequent third point in time, $t_3$ (e.g., where $t_1<t_2<t_3$).

The liquid blending application may calculate the updated blend recipe due to the addition of the second liquid (e.g., due to user input via selections 650-*c* and 650-*d*) and the liquid system may update the display screen in real time accordingly. The liquid blending system may display liquid selection graphical indication 620-*a* (e.g., corresponding to first user input including liquid selection input 605-*b* via selection 650-*a* and selection of coordinate location 615-*a* via selection 650-*b*) and liquid selection graphical indication 620-*b* (e.g., corresponding to second user input including liquid selection input 605-*c* via selection 650-*c* and selection of coordinate location 615-*b* via selection 650-*d*). For instance, in the whiteboard area 610, the amount of the "18 M" graphical indication of the first liquid (at the first coordination location) is changed to 78%, and the amount of the "18 PV" graphical indication of the second liquid is now shown as 22% at the second coordinate location.

The tabular form of the current blend (e.g., the recipe graphical indication 655) on the right side of the display screen is also updated in real time on the display screen 800, and now shows the 2018 Merlot as 78% and the 2018 Petit Verdot has been added as 22%

A user selection of a third liquid and a third coordinate location is also shown (e.g., third user input may include liquid selection input 605-*d* via selection 650-*e* and selection of coordinate location 615-*c* via selection 650-*f*). In the example shown, the user has selected "John Allen Cabernet Sauvignon", also shown as "JA CS". The exemplary third coordinate location 615-*c* has a similar x-axis value to the first coordinate location 615-*a* and the second coordinate location 615-*b*. The y-axis value of the third coordinate location 615-*c* is slightly below the first coordinate location 615-*a*. The user input (e.g., selection 650-*e* and/or selection 650-*f*) sends the third liquid and the third coordinate location to the liquid blending application. The liquid system (e.g., the liquid blending application) may associate the third liquid with the third coordinate location 615-*c*, update the blend recipe (e.g., update the recipe graphical indication 655), and calculate the updated blend recipe based at least in part on the coordinate locations of the liquids, and again updates the display screen in real time based on the updated blend recipe.

Figure 9:
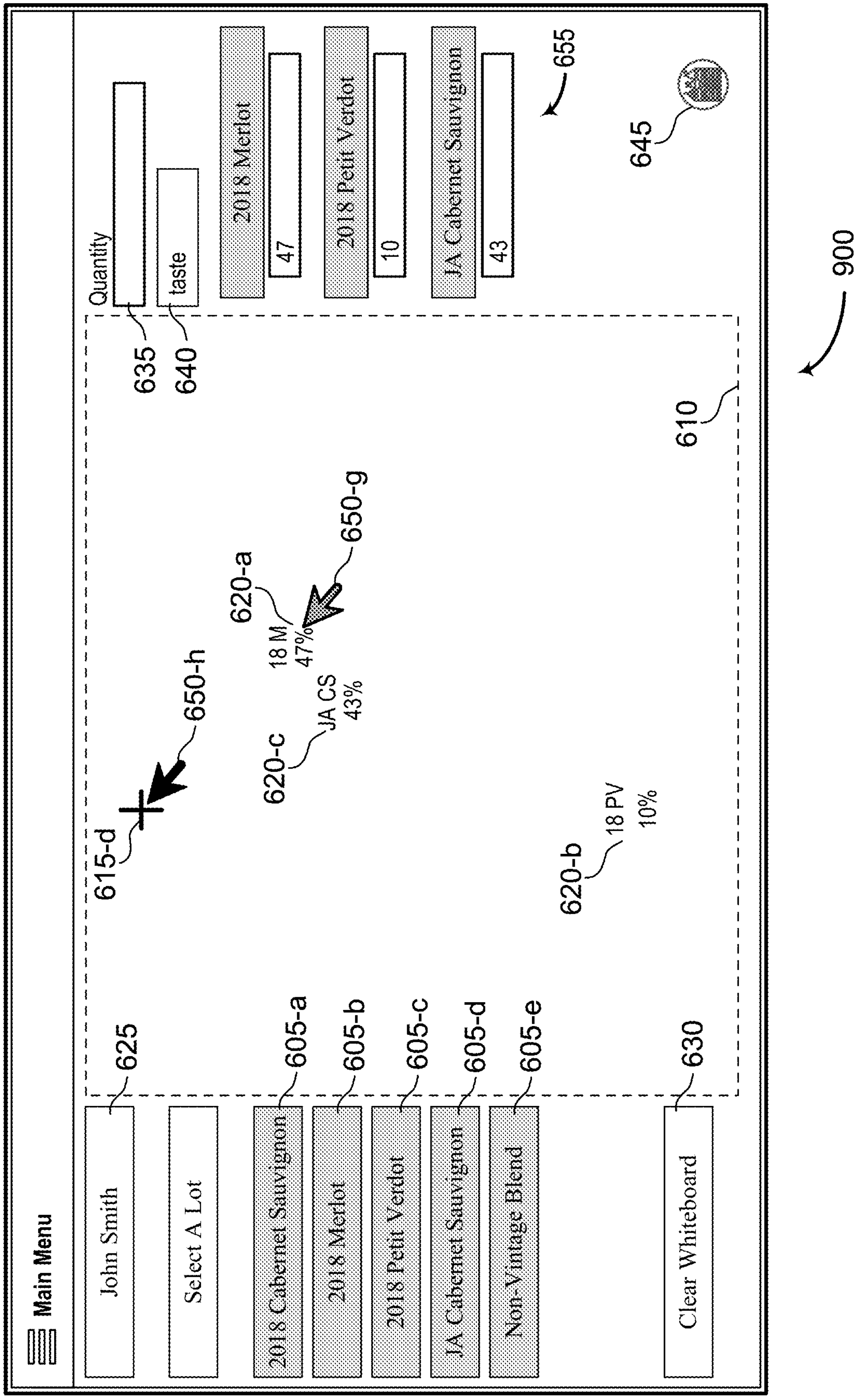

FIG. 9 shows an example of an exemplary screen display 900 by a liquid blending system according to aspects of the present disclosure. Display 900 (e.g., an example display screen 900, which may be displayed via a display of a liquid system as described herein, for example, with reference to FIGS. 1, 2, and 5) is an example of, or includes aspects of, the corresponding element described with reference to FIGS. 1, 2, 5-8, and 10-20. In one aspect, display 900 includes liquid selection inputs 605, whiteboard area 610, coordinate locations 615, liquid selection graphical indications 620, user account icon 625, clear whiteboard icon 630, quantity icon 635, taste icon 640, action icon 645, selections 650, and recipe graphical indication 655.

In some aspects, the exemplary display screen 900 of a liquid blending system is shown at a fourth point in time in FIG. 9. For example, exemplary display screen 600 may illustrate a display screen at a first point in time, $t_1$, exemplary display screen 700 may illustrate a display screen at a subsequent second point in time, $t_2$, exemplary display screen 800 may illustrate a display screen at a subsequent third point in time, $t_3$, and exemplary display screen 900 may illustrate a display screen at a subsequent fourth point in time, $t_4$ (e.g., where $t_1<t_2<t_3<t_4$).

A liquid blending application may calculate the updated blend recipe due to the addition of the third liquid and may update the display screen in real time accordingly. The amount of the "18 M" graphical indication of the first liquid is changed to 47%, the amount of the "18 PV" graphical indication of the second liquid is now 10%, and the amount of the "JA CS" graphical indication of the third liquid is shown as 43% at the third coordinate location.

The tabular form of the current blend is also updated in real time on the display screen, and now shows the "2018 Merlot" as 47 (percent), the "2018 Petit Verdot" at 10 (percent), and the "John Allen Cabernet Sauvignon" has been added at 43%.

In the example of FIG. 9, user selection of liquid selection graphical indication 620-*a* (e.g., user selection of the graphical indication of the first liquid on the whiteboard area 610) is shown via selection 650-*g*. Also shown is a user selection of a fourth coordinate location 615-*d* via selection 650-*h*.

In response, the user input (e.g., selections 650-*g* and/or 650-*h*) sends the updated (fourth) coordinate location 615-*d* to the liquid blending application, which updates the first liquid to be associated with the fourth coordinate application, and calculates the updated blend recipe. That is, as shown in FIGS. 9 and 10, the user input (e.g., selections 650-*g* and/or 650-*h*) replaces or moves liquid selection graphical indication 620-*a* to a different location (e.g., from first coordinate location 615-*a* to fourth coordinate location 615-*d*).

Figure 10:
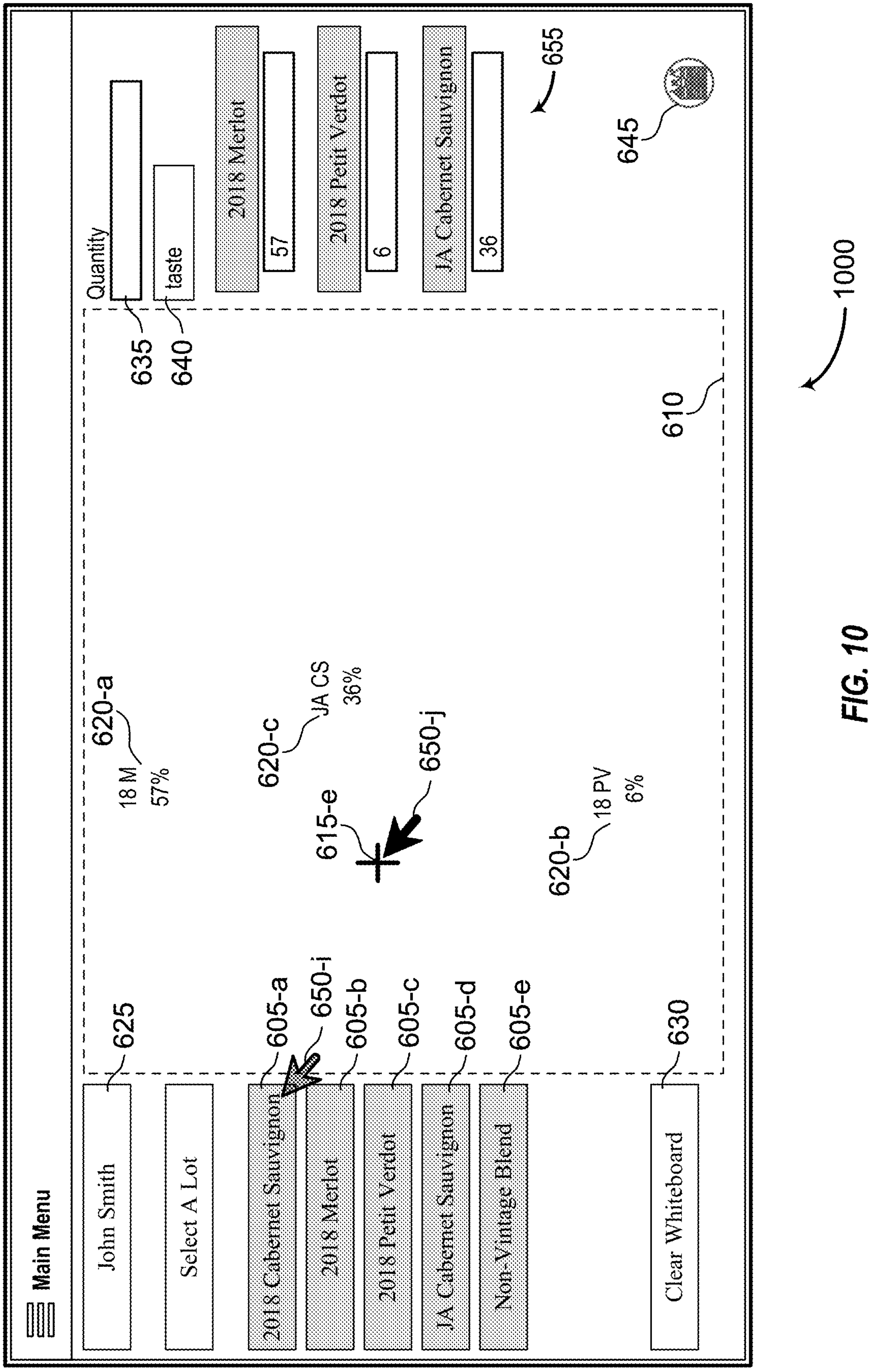

FIG. 10 shows an example of an exemplary screen display 1000 by a liquid blending system according to aspects of the present disclosure. Display 1000 (e.g., an example display screen 1000, which may be displayed via a display of a liquid system as described herein, for example, with reference to FIGS. 1, 2, and 5) is an example of, or includes aspects of, the corresponding element described with reference to FIGS. 1, 2, 5-9, and 11-20. In one aspect, display 1000 includes liquid selection inputs 605, whiteboard area 610, coordinate locations 615, liquid selection graphical indications 620, user account icon 625, clear whiteboard icon 630, quantity icon 635, taste icon 640, action icon 645, selections 650, and recipe graphical indication 655.

In some aspects, the exemplary display screen 1000 of a liquid blending system is shown at a fifth point in time in FIG. 10. For example, exemplary display screen 600 may illustrate a display screen at a first point in time, $t_1$, exemplary display screen 700 may illustrate a display screen at a subsequent second point in time, $t_2$, exemplary display screen 800 may illustrate a display screen at a subsequent third point in time, $t_3$, exemplary display screen 900 may illustrate a display screen at a subsequent fourth point in time, $t_4$, and exemplary display screen 1000 may illustrate a display screen at a subsequent fifth point in time, $t_5$ (e.g., where $t_1<t_2<t_3<t_4<t_5$).

A liquid blending application may calculate the updated blend recipe due to the moving of the first liquid from the first coordinate location 615-*a* to the fourth coordinate location 615-*d* and update the display screen in real time accordingly (e.g., to display an updated recipe graphical indication 655). In the whiteboard area 610 the location "18 M" graphical indication of the first liquid is moved to the fourth coordinate location 615-*d* and the amount changed to 57%, the amount of the "18 PV" graphical indication of the second liquid is now 6%, and the amount of the "JA CS" graphical indication of the third liquid is now 36%. That is, the liquid selection graphical indication 620-*a* is updated from 47% to 57%, the liquid selection graphical indication 620-*b* is updated from 10% to 6%, and the liquid selection graphical indication 620-*c* is updated from 43% to 36%. As before, the tabular form (e.g., the recipe graphical indication 655) is also updated in real time accordingly.

A user selection of a fourth liquid and a fifth coordinate location is also shown (e.g., fourth user input may include input of liquid selection input 605-*a* via selection 650-*i* and input of coordinate location 615-*e* via selection 650-*j*). In the example shown, the user has selected "2018 Cabernet Sauvignon", also shown as "18 CV". The user input sends the fourth liquid and the fifth coordinate location 615-*e* to the liquid blending application, which associates the fourth liquid (e.g., the liquid selection input 605-*a*) with the fifth coordinate location 615-*e*, and the liquid blending application again updates the blend recipe and calculates the updated blend recipe based at least in part on the updated coordinate locations of the liquids, and again updates the display screen in real time based on the updated blend recipe.

This method permits users to visualize liquid blends (e.g., wine blends) as if they were brainstorming on a traditional whiteboard. When a liquid has been added to the whiteboard area 610 (e.g., via liquid selection inputs 605, which in some examples may include a scrolling, selectable Wine Column), corresponding liquid selection graphical indications 620 may be moved around the whiteboard area 610 by selecting and moving the liquid selection graphical indications 620. In some examples, liquid selection graphical indications 620 may be deleted from the whiteboard area 610 in some embodiments (e.g., by double tapping on a liquid selection graphical indication 620, by selecting the clear whiteboard icon 630, etc.). In some embodiments, when a liquid is moved towards the top of the whiteboard area 610, the percentage of the liquid in the wine blend may increase. In such embodiments, when a liquid (e.g., a wine lot) is moved towards the bottom of the screen, its percentage in the blend decreases. In some embodiments, when multiple liquids (e.g., multiple wine lots) are simultaneously touch selected, they can be moved around the screen in unison. This feature permits the user to maintain the same proportions of the multi-selected lots.

Figure 13:
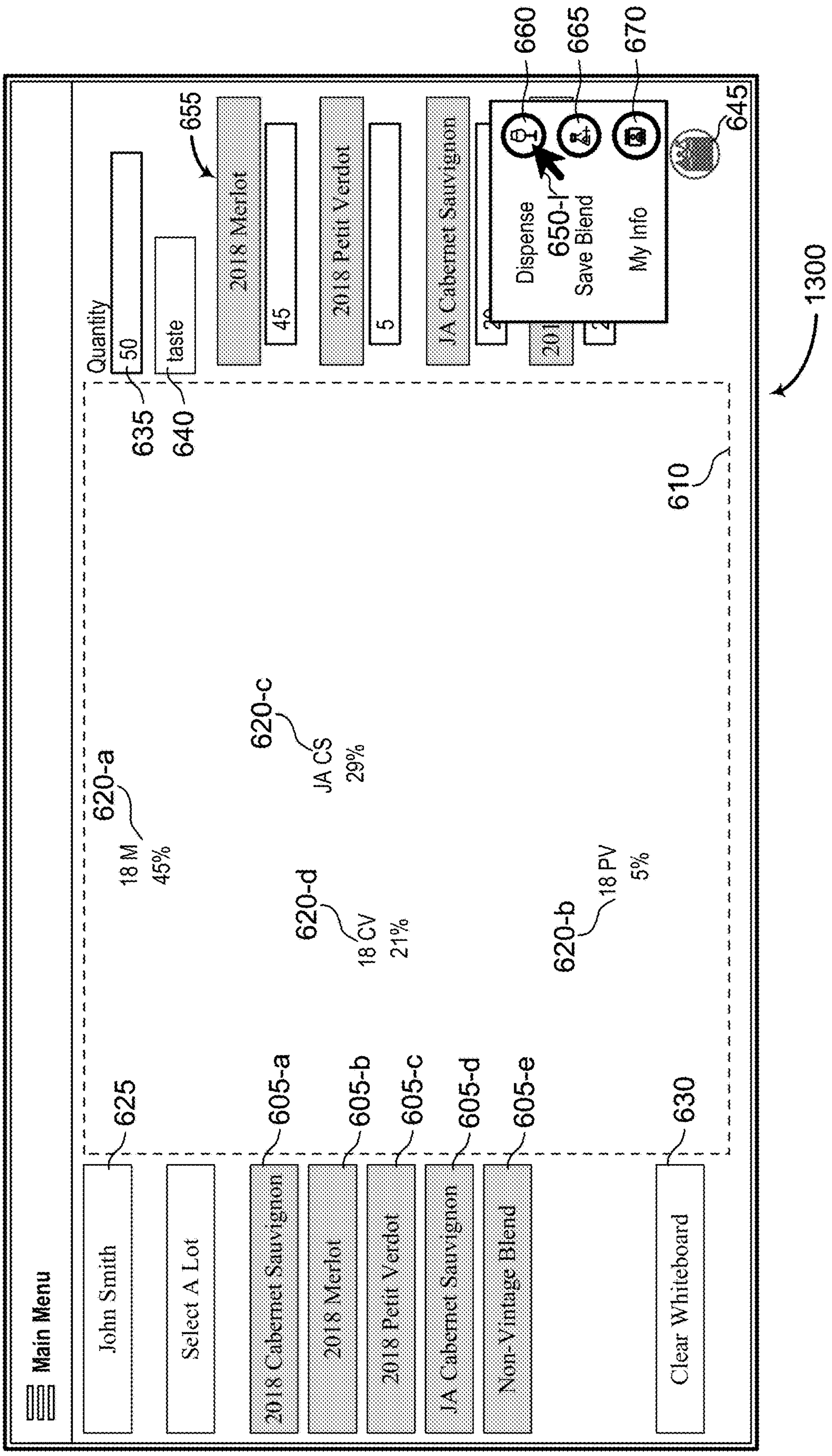
Figure 14:
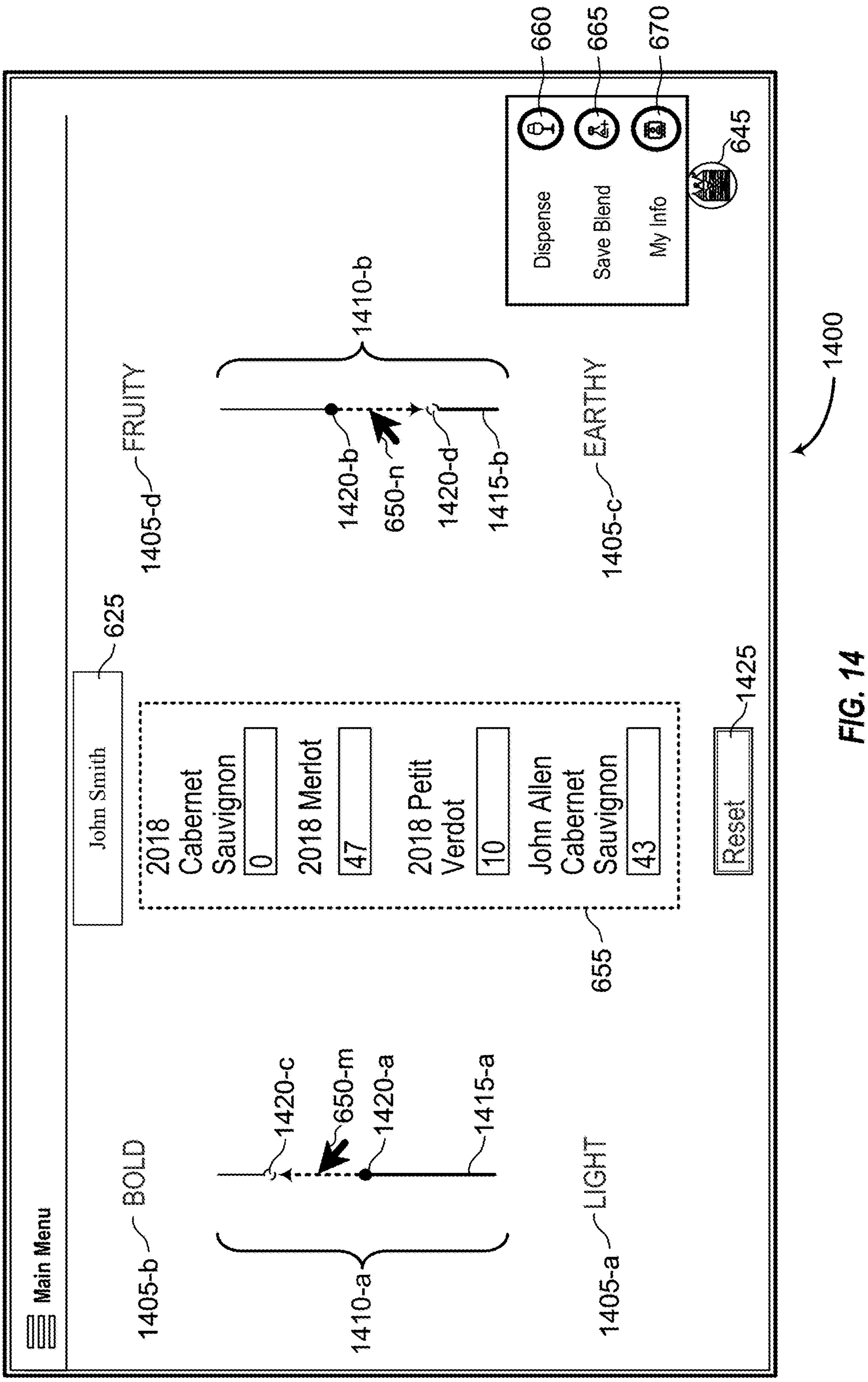
Figure 15:
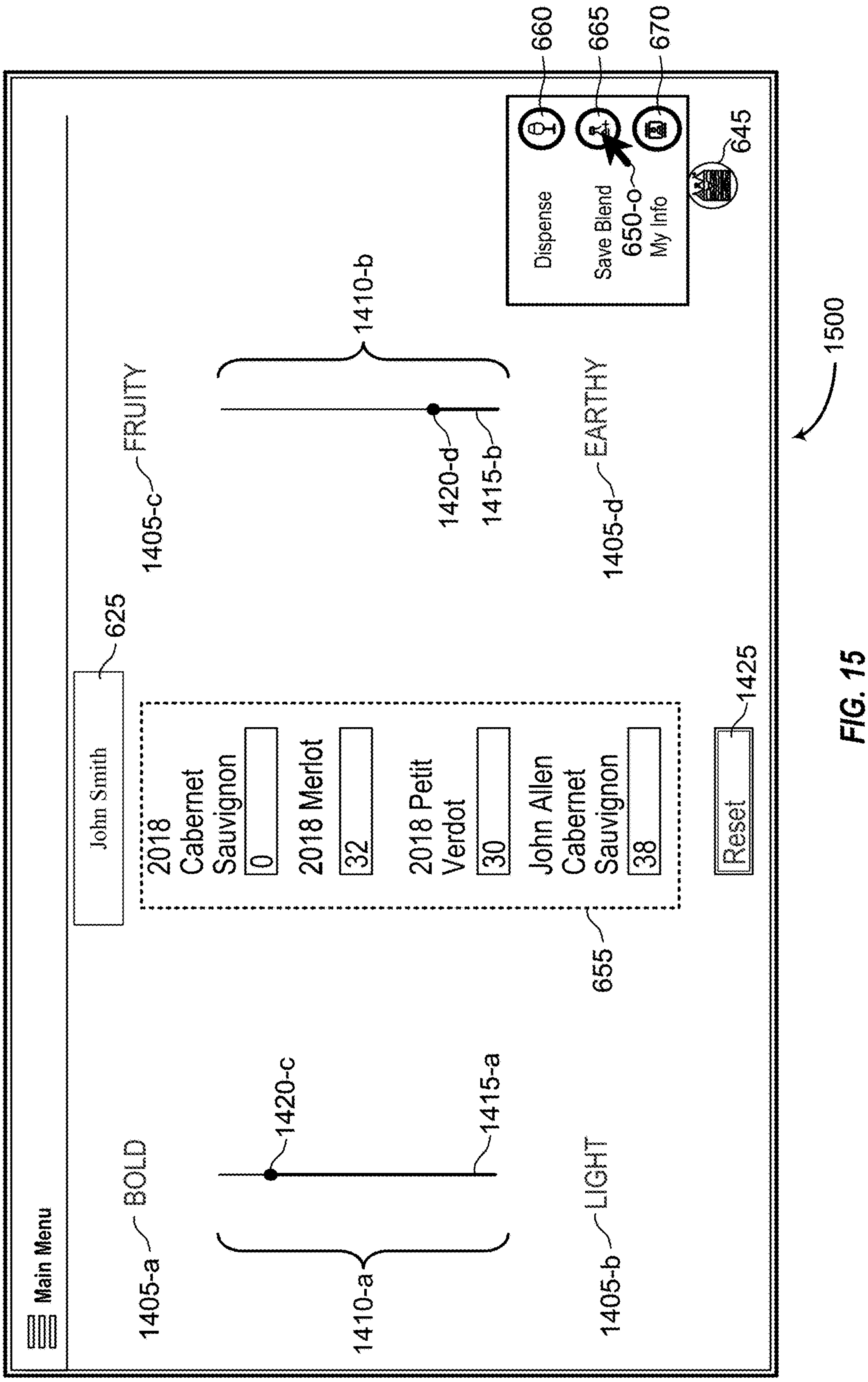

At any point during such blend visualization processes, a user can save or dispense the current blend or review past blends by selecting the appropriate option from the action graphical indicator (e.g., from expanding the action icon 645, as described in more detail herein, for example, with reference to FIGS. 13-15).

In some embodiments, selection of a liquid blend may result in an interactive screen where the user may select from a plurality of liquid blending options starting with the selected liquid blend. For example, the whiteboard interface may be entered using the blend as a starting point, or a slider interface (e.g., as described in more detail herein, for example, with reference to FIGS. 14 and 15) may be entered using the selected blend.

Figure 11:
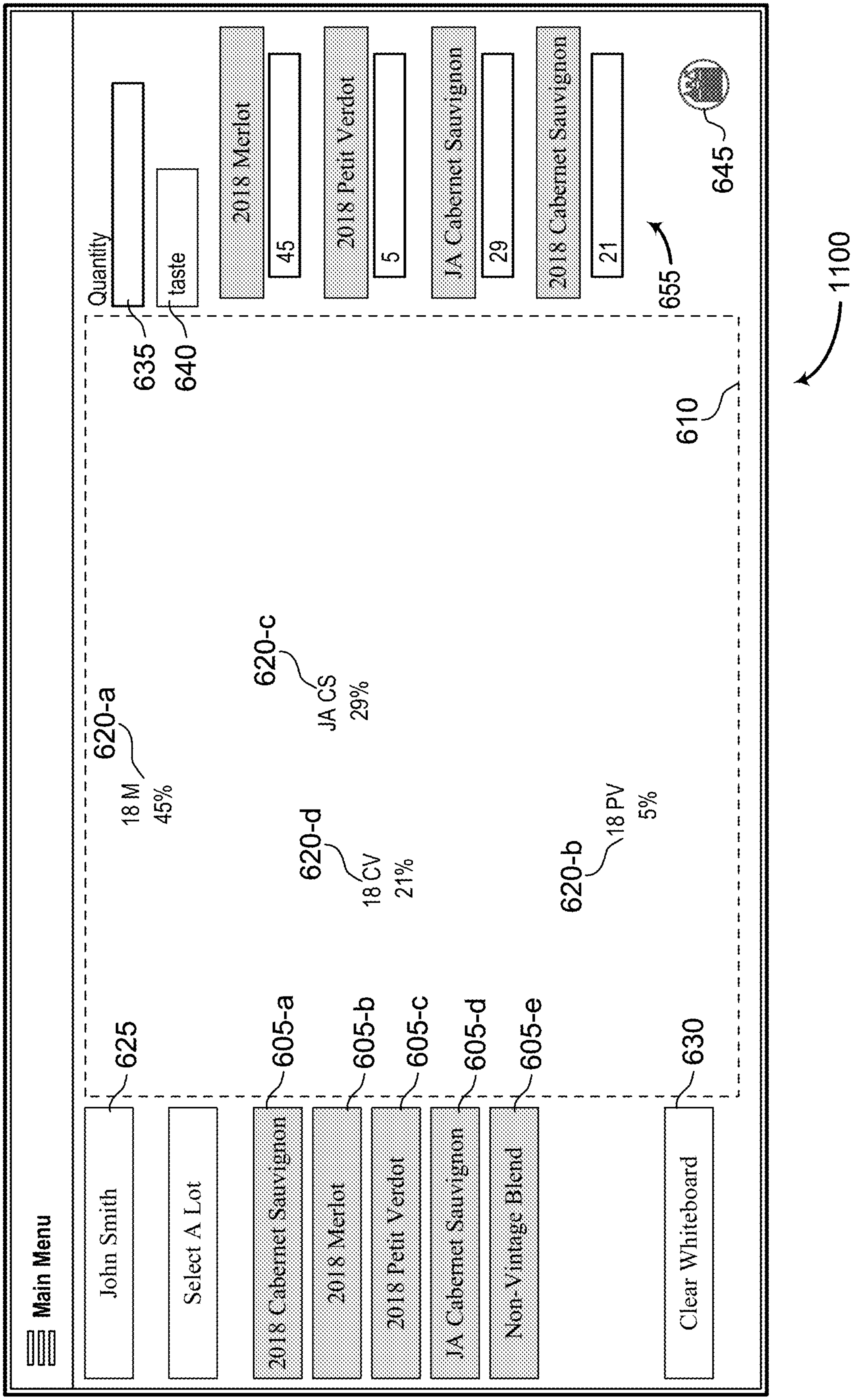

FIG. 11 shows an example of an exemplary screen display 1100 by a liquid blending system according to aspects of the present disclosure. Display 1100 (e.g., an example display screen 1100, which may be displayed via a display of a liquid system as described herein, for example, with reference to FIGS. 1, 2, and 5) is an example of, or includes aspects of, the corresponding element described with reference to FIGS. 1, 2, 5-10, and 12-20. In one aspect, display 1100 includes liquid selection inputs 605, whiteboard area 610, coordinate locations 615, liquid selection graphical indications 620, user account icon 625, clear whiteboard icon 630, quantity icon 635, taste icon 640, action icon 645, selections 650, and recipe graphical indication 655.

In some aspects, the exemplary display screen 1100 of a liquid blending system is shown at a sixth point in time in FIG. 11. For example, exemplary display screen 600 may illustrate a display screen at a first point in time, $t_1$, exemplary display screen 700 may illustrate a display screen at a subsequent second point in time, $t_2$, exemplary display screen 800 may illustrate a display screen at a subsequent third point in time, $t_3$, exemplary display screen 900 may illustrate a display screen at a subsequent fourth point in time, $t_4$, exemplary display screen 1000 may illustrate a display screen at a subsequent fifth point in time, $t_5$, and exemplary display screen 1100 may illustrate a display screen at a subsequent sixth point in time, $t_6$ (e.g., where $t_1<t_2<t_3<t_4<t_5<t_6$).

A liquid blending application may calculate the updated blend recipe due to the addition of the fourth liquid and may update the display screen in real time accordingly. The amount of the "18 M" graphical indication of the first liquid (e.g., liquid selection graphical indication 620-*a*) is changed to 45%, the amount of the "18 PV" graphical indication of the second liquid (e.g., liquid selection graphical indication 620-*b*) is now 5%, the amount of the "JA CS" graphical indication of the third liquid (e.g., liquid selection graphical indication 620-*c*) is now 29%, and the amount of the "18 CV" graphical indication of the fourth liquid (e.g., liquid selection graphical indication 620-*d*) is shown as 21% at the fifth coordinate location (e.g., at coordinate location 615-*e*).

The tabular form of the current blend (e.g., a graphical recipe indication 655) is also updated in real time on the display screen as described herein.

Figure 12:
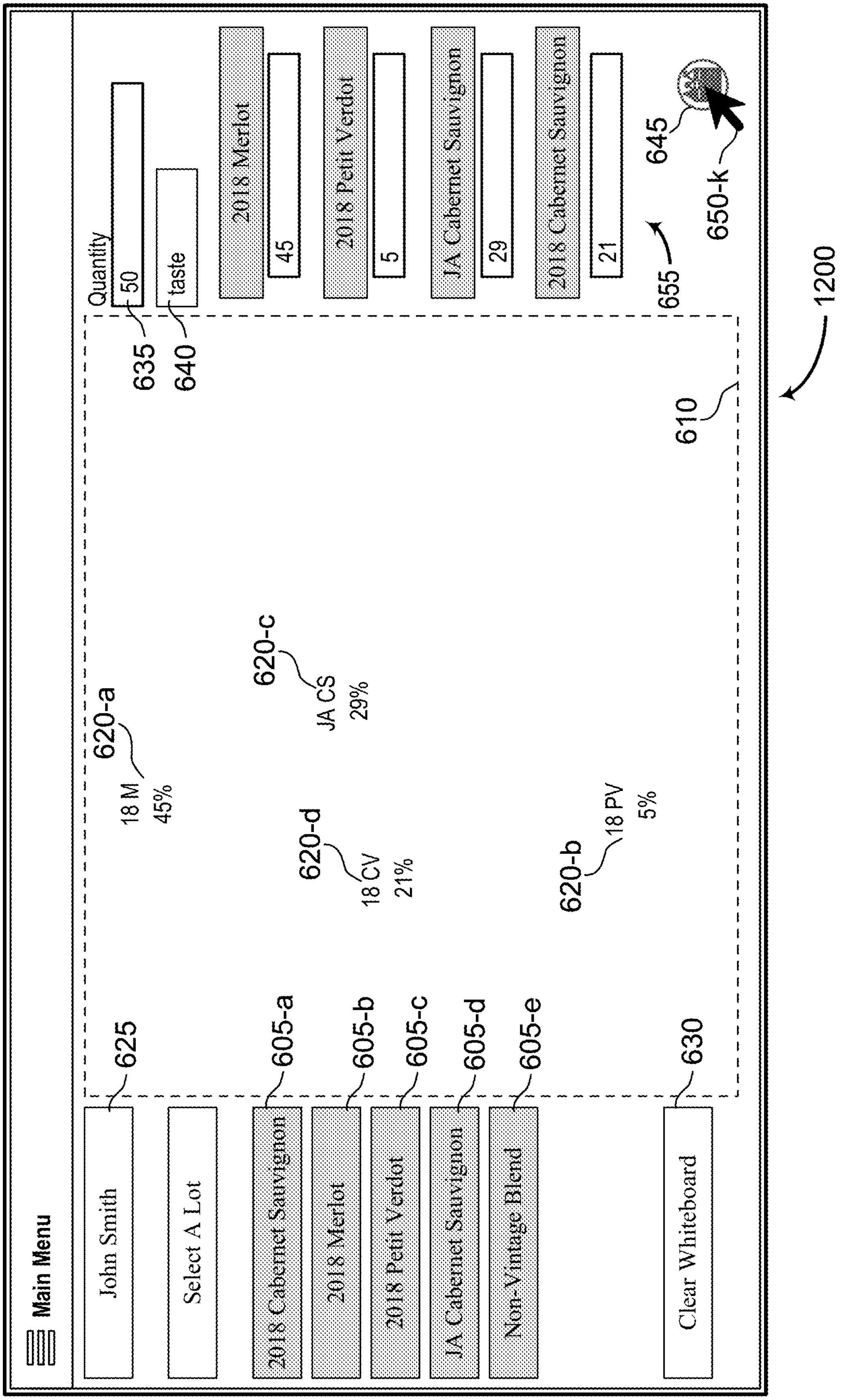

FIG. 12 shows an example of an exemplary screen display 1200 by a liquid blending system according to aspects of the present disclosure. Display 1200 (e.g., an example display screen 1200, which may be displayed via a display of a liquid system as described herein, for example, with reference to FIGS. 1, 2, and 5) is an example of, or includes aspects of, the corresponding element described with reference to FIGS. 1, 2, 5-11, and 13-20. In one aspect, display 1200 includes liquid selection inputs 605, whiteboard area 610, coordinate locations 615, liquid selection graphical indications 620, user account icon 625, clear whiteboard icon 630, quantity icon 635, taste icon 640, action icon 645, selections 650, and recipe graphical indication 655.

In some aspects, the exemplary display screen 1200 of a liquid blending system is shown at a seventh point in time in FIG. 12. For example, exemplary display screen 600 may illustrate a display screen at a first point in time, $t_1$, exemplary display screen 700 may illustrate a display screen at a subsequent second point in time, $t_2$, exemplary display screen 800 may illustrate a display screen at a subsequent third point in time, $t_3$, exemplary display screen 900 may illustrate a display screen at a subsequent fourth point in time, $t_4$, exemplary display screen 1000 may illustrate a display screen at a subsequent fifth point in time, $t_5$, exemplary display screen 1100 may illustrate a display screen at a subsequent sixth point in time, $t_6$, and exemplary display screen 1200 may illustrate a display screen at a subsequent seventh point in time, $t_7$ (e.g., where $t_1<t_2<t_3<t_4<t_5<t_6<t_7$).

While for illustrative purposes FIG. 12 is described as following the steps of FIG. 11, it is to be understood that the steps of FIG. 12 can take place at any point in time when one or more liquids are selected. A user selection of an action icon 645 on the display screen 1200 is shown (e.g., which may expand the options of the action icon 645 as described in more detail herein, for example, with reference to FIG. 13).

FIG. 13 shows an example of an exemplary screen display 1300 by a liquid blending system according to aspects of the present disclosure. Display 1300 (e.g., an example display screen 1300, which may be displayed via a display of a liquid system as described herein, for example, with reference to FIGS. 1, 2, and 5) is an example of, or includes aspects of, the corresponding element described with reference to FIGS. 1, 2, 5-12, and 14-20. In one aspect, display 1300 includes liquid selection inputs 605, whiteboard area 610, coordinate locations 615, liquid selection graphical indications 620, user account icon 625, clear whiteboard icon 630, quantity icon 635, taste icon 640, action icon 645 (e.g., which includes dispense icon 660, save blend icon 1360, and account information icon 1365), selections 650, and recipe graphical indication 655.

In some aspects, the exemplary display screen 1300 of a liquid blending system is shown at an eighth point in time in FIG. 13. For example, exemplary display screen 600 may illustrate a display screen at a first point in time, $t_1$, exemplary display screen 700 may illustrate a display screen at a subsequent second point in time, $t_2$, exemplary display screen 800 may illustrate a display screen at a subsequent third point in time, $t_3$, exemplary display screen 900 may illustrate a display screen at a subsequent fourth point in time, $t_4$, exemplary display screen 1000 may illustrate a display screen at a subsequent fifth point in time, $t_5$, exemplary display screen 1100 may illustrate a display screen at a subsequent sixth point in time, $t_6$, exemplary display screen 1200 may illustrate a display screen at a subsequent seventh point in time, $t_7$, and exemplary display screen 1300 may illustrate a display screen at a subsequent eighth point in time, $t_8$ (e.g., where $t_1<t_2<t_3<t_4<t_5<t_6<t_7<t_8$).

In response to user selection of the action icon 645, an action pop-up menu is shown. In the exemplary action pop-up menu, icons for various selectable actions are shown, including a dispense icon 660, a save blend icon 665, and a "my info" icon or account information icon 670. In other embodiments, different action icons may be shown, and more or fewer action icons may be shown.

A user selection of the dispense icon 660 is shown, which sends an indication to the liquid blending application for dispensing of a liquid serving (e.g., a beverage serving) according to the current blend recipe (e.g., which may be shown in updated recipe graphical indication 655).

FIG. 14 shows an example of an exemplary screen display 1400 by a liquid blending system according to aspects of the present disclosure. Display 1400 (e.g., an example display screen 1400, which may be displayed via a display of a liquid system as described herein, for example, with reference to FIGS. 1, 2, and 5) is an example of, or includes aspects of, the corresponding element described with reference to FIGS. 1, 2, 5-13, and 15-20. In one aspect, display 1400 includes sensory characteristics 1405, slider interface displays 1410, and reset icon 1425. In some embodiments, a slider interface display 1410 includes a slider 1415 and a sensory characteristic value 1420.

Sensory characteristics 1405, slider interface displays 1410, sliders 1415, sensory characteristic values 1420, and reset icon 1425 are each examples of, or each include aspects of, corresponding elements described with reference to FIG. 15.

In FIG. 14, an exemplary display screen 1400 of the liquid blending system is shown for a slider blend adjustment.

In the embodiment shown, after the user selects the dispense icon 660, the user is presented with an additional opportunity to modify the current blend recipe using the slider adjustments (e.g. via slider interface display 1410-*a* and slider interface display 1410-*b*). In other embodiments, the liquid blending system may proceed directly to dispensing without further opportunity for adjustment of the blend recipe.

The display screen comprises a first slider interface display 1410-*a*, a second slider interface display 1410-*b*, and a blend recipe area (e.g., recipe graphical indication 655).

The blend recipe area (e.g., recipe graphical indication 655) displays each of the selected beverages (e.g., the blend recipe area displays each of the selected beverages, such as four different liquids or wines in the present example), along with the current percentage of each liquid in the blend (e.g., of each beverage or liquid in the blend). The percentages shown are prior to user slider inputs. By tapping the user name (e.g., user icon 625) at the top of the blend recipe area, the system can also toggle between multiple users. The user can reset the sliders 1415 to the starting position at any time by using the reset button.

The first slider interface display 1410-*a* includes a first slider 1415-*a* having a first position (e.g., a first sensory characteristic value 1420-*a*) along a linear first slider line 1415-*a*. A first liquid sensory characteristic 1405-*a* ("LIGHT") is shown proximate to one endpoint of the first slider line 1415-*a*, and a second liquid sensory characteristic 1405-*b* ("BOLD") is shown proximate to the opposite endpoint of the first slider line 1415-*a*.

A user input for moving the first slider from the first position of the first slider to the second position of the first slider is also shown. In the example shown, the user input (e.g., selection 650-*m*) moves a first slider 1415-*a* from a first sensory characteristic value 1420-*a* to a second sensory characteristic value 1420-*c* (e.g., first sensory characteristic value 1420-*a* is moved away from "LIGHT" and towards "BOLD" at second sensory characteristic value 1420-*c*, via user selection 650-*m* on the slider 1415-*a*.

The second slider interface display 1410-*b* includes a second slider 1415-*b* having a first position (sensory characteristic value 1420-*b*) along a linear second slider line 1415-*b*. A third liquid sensory characteristic 1405-*c* ("EARTHY") is shown proximate to one endpoint of the second slider line 1415-*b*, and a fourth liquid sensory characteristic 1405-*d* ("FRUITY") is shown proximate to the opposite endpoint of the second slider line 1415-*b*.

A user input for moving the second slider from the first position of the second slider to the second position of the second slider is also shown. In the example shown, the user input (e.g., selection 650-*n*) moves a second slider 1415-*b* from a third sensory characteristic value 1420-*b* to a fourth sensory characteristic value 1420-*d* (e.g., first sensory characteristic value 1420-*b* is moved away from "FRUITY" and towards "EARTHY" at second sensory characteristic value 1420-*d*, via user selection 650-*n* on the slider 1415-*b*.

The starting liquid blend for the Slider blend Screen can be selected from the user's past blend history, the whiteboard area, from a Guided Ranking Screen or from a selection of pre-loaded liquid blends.

In some embodiments each slider interface display 1410 may be, or may include, a touch sensitive, visual representation of increasing or decreasing a particular characteristic in a liquid. In some aspects, slider interface displays 1410 may be analogous to a slider seen on stereo equipment for adjusting speaker balance from left to center to right. By default, the slider is set in the middle. Moving the slider to the top of the screen may increase the composition of the characteristic in the liquid blend. Moving the slider towards the bottom of the screen may decrease the composition of the characteristic in the liquid blend. The two current default sliders control the impression of Fruit and the impression of Tannin in the liquid blend. The user has the option to select other slider characteristics such as acidity or oak or can have them recommended based on their Holistic, Open-Ended, Evolving Phenotyping (HOEP) (described in more detail herein, for example, with reference to FIG. 21).

The Slider system allows users to instantly personalize liquid blends (e.g., wine blends) by adjusting a range of touchscreen sliders that adjust the level of selected liquid characteristics (e.g., which, in some examples, may include sensory characteristics of wine). For example, if the Tannin and Fruit sliders are selected, a user can move the sliders to adjust the tannin and fruit levels in the liquid. By tasting the change in the liquid after each adjustment, the user also gains a better understanding of the selected characteristics. During blending, the user can also select and rank their favorite blends. The blending and ranking process data are added to the user's HOEP, Key Element Ranking and Aggregate Correlated Influencer Model.

FIG. 15 shows an example of an exemplary screen display 1500 by a liquid blending system according to aspects of the present disclosure. Display 1500 (e.g., an example display screen 1500, which may be displayed via a display of a liquid system as described herein, for example, with reference to FIGS. 1, 2, and 5) is an example of, or includes aspects of, the corresponding element described with reference to FIGS. 1, 2, 5-14, and 16-20. In one aspect, display 1500 includes sensory characteristics 1405, slider interface displays 1410, and reset icon 1425. In some embodiments, a slider interface display 1410 includes a slider 1415 and a sensory characteristic value 1420.

Sensory characteristics 1405, slider interface displays 1410, sliders 1415, sensory characteristic values 1420, and reset icon 1425 are each examples of, or each include aspects of, corresponding elements described with reference to FIG. 14.

In FIG. 15, an exemplary display screen of a liquid blending system is shown after the slider blend adjustment example of FIG. 14.

A liquid bending application may receive the user input from the moving of the first slider 1415-*a* and the moving of the second slider 1415-*b* and has in response updated the blend recipe using the user inputs, in real time.

The liquid percentages in the blend recipe area are also updated in real time based on the updated blend recipe graphical indication 655, as shown in FIG. 15. Also shown is a user selection of the "save blend" icon 665 via selection 650-*o*.

Alternatively, the user can select the dispense icon 660. In response, the blend recipe shown on the screen is saved in the database for that user, and the liquid blend is dynamically created in real time and dispensed at the selected quantity. In the Whiteboard mode, the dispense option 660 automatically saves the blend in the user profile.

In some embodiments, the blending application not only adjusts the liquid percentages based on the slider adjustments, but also based on the data and deep learning relationships (HOEP) of the liquids and also the user's HOEP.

Figure 16:
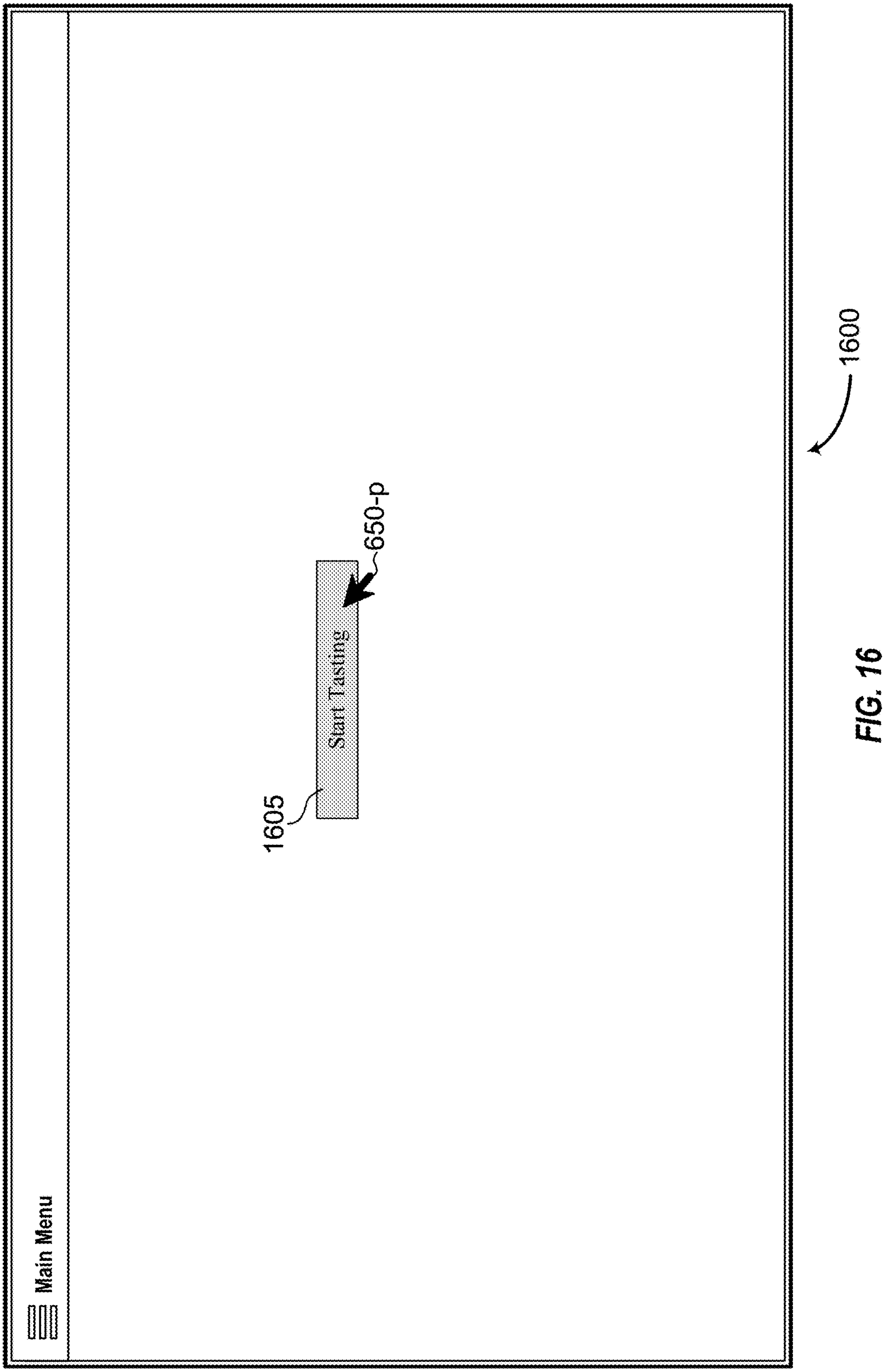

FIG. 16 shows an example of an exemplary screen display 1600 by a liquid blending system according to aspects of the present disclosure. In one aspect, display 1600 includes start tasting icon 1605 and selection 650-*p*. Display 1600 (e.g., an example display screen 1600, which may be displayed via a display of a liquid system as described herein, for example, with reference to FIGS. 1, 2, and 5) is an example of, or includes aspects of, the corresponding element described with reference to FIGS. 1, 2, 5-15, and 17-20.

In FIG. 16, the exemplary display screen 1600 of a liquid blending system is shown.

In response to various user inputs, a liquid blending application may show a graphical indication such as a start tasting icon 1605. In response to user selection of the start tasting icon (e.g., via selection 650-*p*), the liquid blending application may then send instruction to the liquid dispensing system for dispensing of a liquid (e.g., for dispensing of a beverage) according to the currently selected blend recipe. The blended liquid may then be dispensed to the user and may be evaluated by the user as described in more detail herein.

Figure 17:
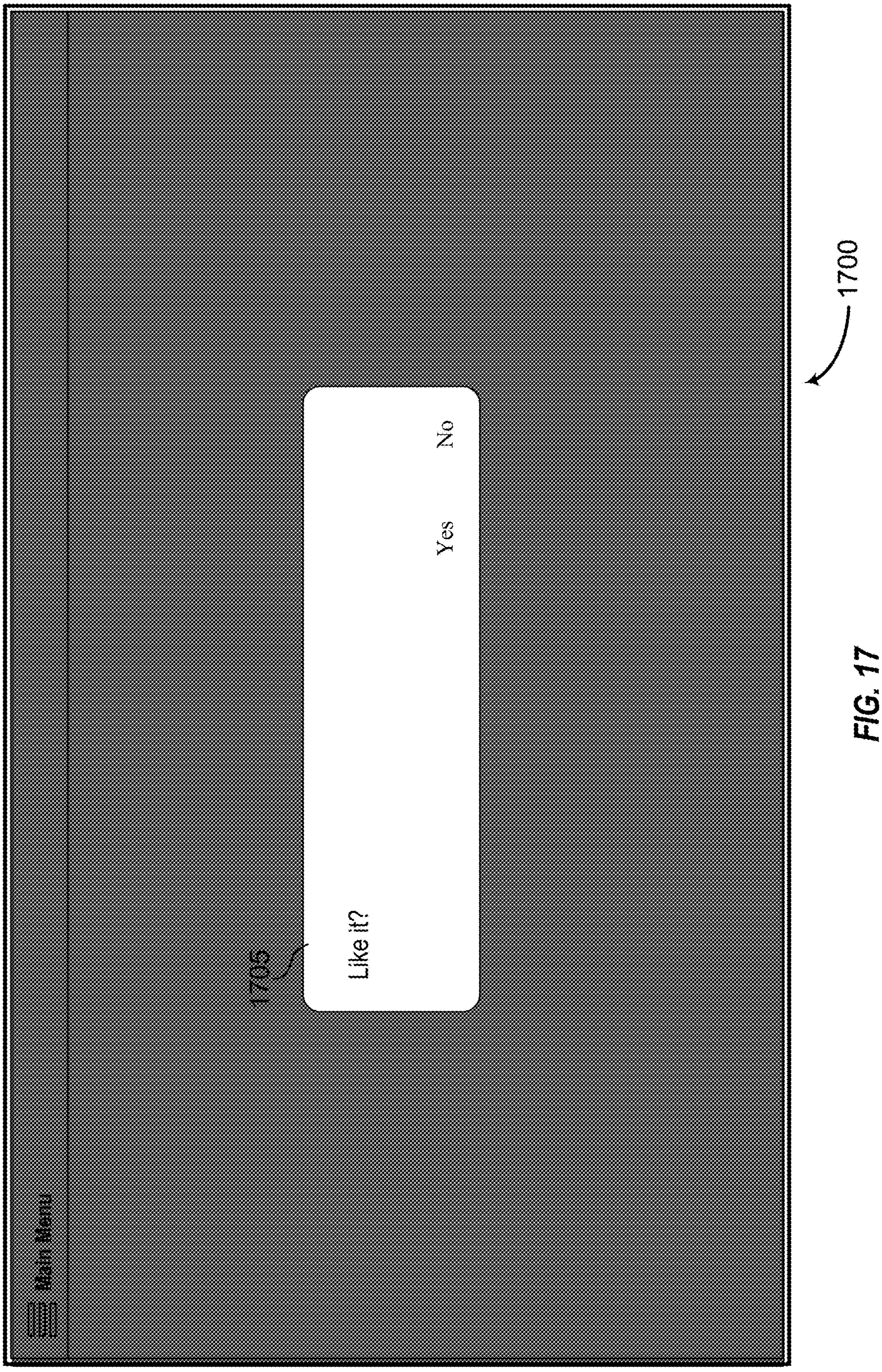

FIG. 17 shows an example of an exemplary screen display 1700 by a liquid blending system according to aspects of the present disclosure. In one aspect, display 1700 includes interactive feedback display 1705. Display 1700 (e.g., an example display screen 1700, which may be displayed via a display of a liquid system as described herein, for example, with reference to FIGS. 1, 2, and 5) is an example of, or includes aspects of, the corresponding element described with reference to FIGS. 1, 2, 5-16, and 18-20.

In FIG. 17, an exemplary display screen 1700 of a liquid blending system (e.g., after evaluation by the user of the dispensed liquid) is shown.

For instance, after a liquid is dispensed, a liquid blending application may then solicit input from the user regarding their evaluation of the liquid (e.g., a liquid blending application may solicit user input regarding the user's evaluation of the dispensed beverage in terms of preference, flavor, etc.). For instance, in the exemplary display screen of FIG. 17, an interactive feedback display 1705 is shown. In the example of FIG. 17, a binary evaluation input may be solicited (e.g., a binary evaluation input such as "Like It?" with the user selection choices of Yes or No). The user selection is then sent to a liquid blending application and the recipe blend is updated based on the user input.

Figure 18:
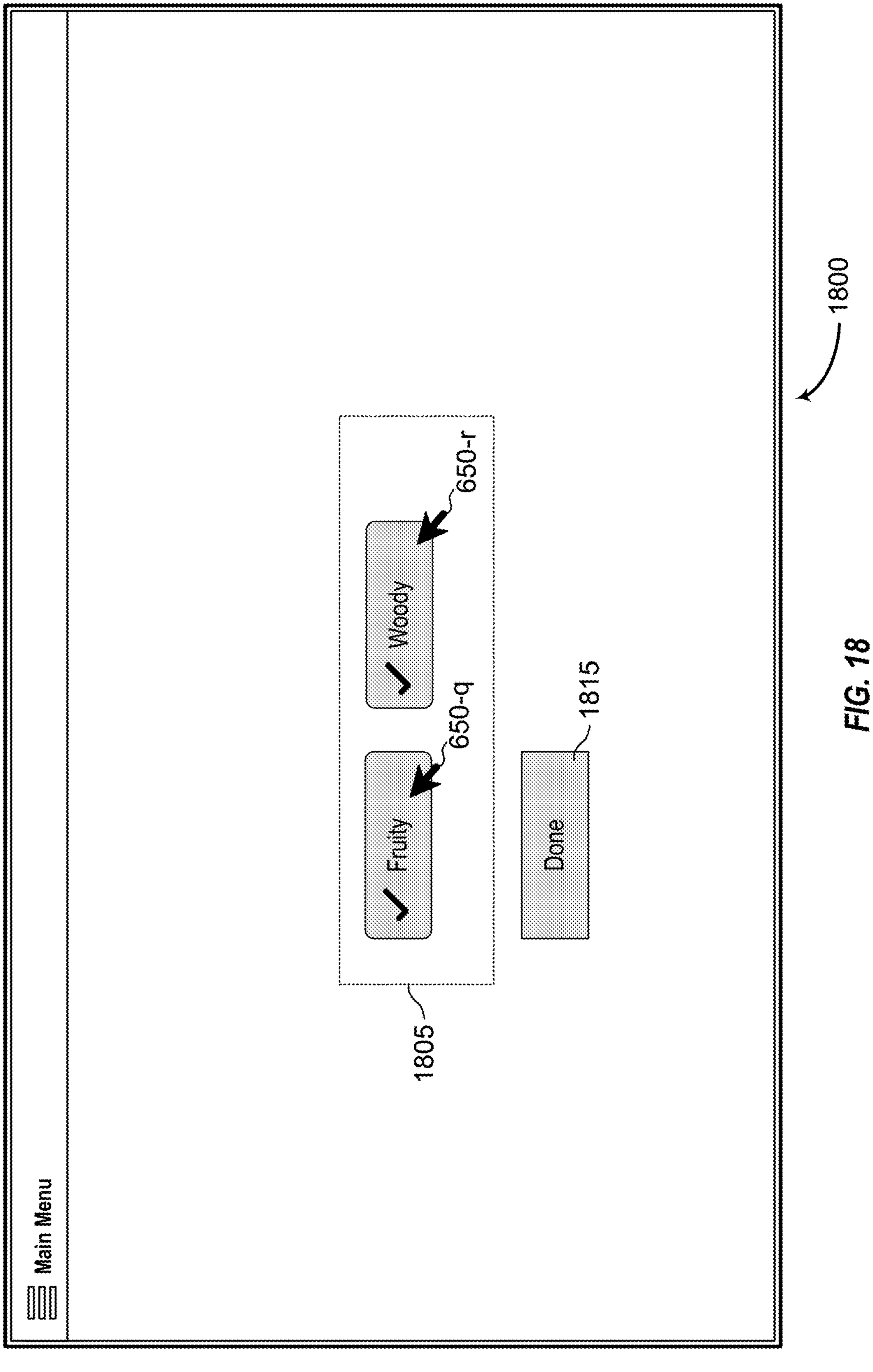

FIG. 18 shows an example of an exemplary screen display 1800 by a liquid blending system according to aspects of the present disclosure. In one aspect, display 1700 includes first-level descriptor icons 1805, completion icon 1815, and selections 650-*q* and 650-*r*. Display 1800 (e.g., an example display screen 1800, which may be displayed via a display of a liquid system as described herein, for example, with reference to FIGS. 1, 2, and 5) is an example of, or includes aspects of, the corresponding element described with reference to FIGS. 1, 2, 5-17, 19, and 20.

In FIG. 18, the exemplary display screen of a liquid blending system is shown during a descriptor evaluation.

In some embodiments, a user has the opportunity to give other or additional feedback such as the descriptor feedback shown in FIG. 18. Shown are a plurality of first-level descriptor icons 1805 (e.g., selectable icons or graphical indications for first-level descriptors) and a completion icon (e.g., a "Done" icon). In the example of FIG. 18, the user may select both first-level descriptor icons shown (e.g., "Fruity" and "Woody" first-level descriptor icons 1805) via selection 650-*q* and selection 650-*r*.

In some embodiments the user selections may be sent to a liquid blending application and may be used for updated the blend recipe (e.g., via user selection of a completion icon 1815).

Figure 19:
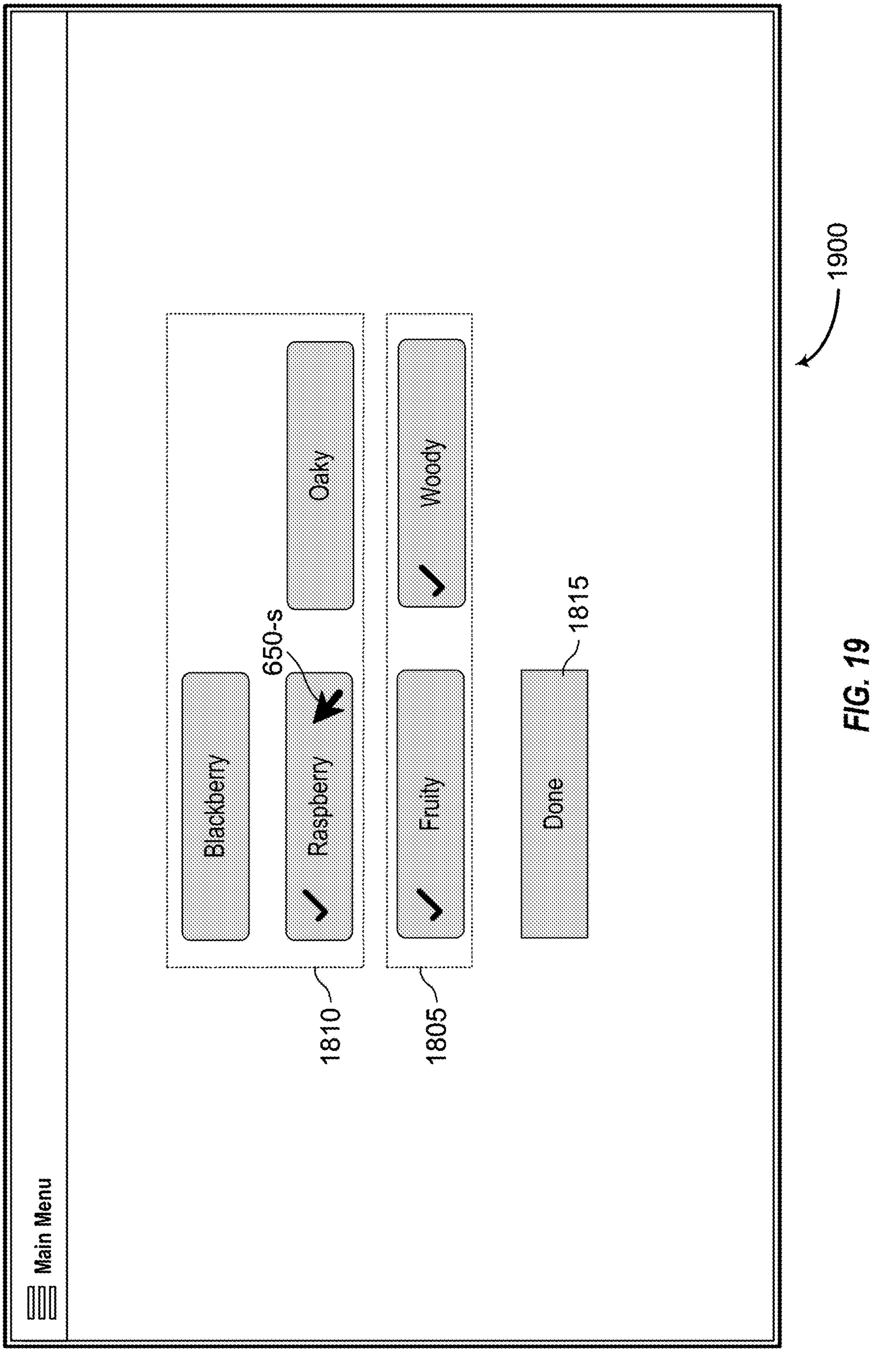

FIG. 19 shows an example of an exemplary screen display 1900 by a liquid blending system according to aspects of the present disclosure. In one aspect, display 1900 includes first-level descriptor icons 1805, second-level descriptor icons 1810, completion icon 1815, and selection 650-*s*. Display 1900 (e.g., an example display screen 1900, which may be displayed via a display of a liquid system as described herein, for example, with reference to FIGS. 1, 2, and 5) is an example of, or includes aspects of, the corresponding element described with reference to FIGS. 1, 2, 5-18, and 20.

In FIG. 19, an exemplary display screen 1900 of a liquid blending system is shown during another descriptor evaluation.

In some embodiments, selection of one or more first-level descriptor icons 1805 leads to display of additional second-level descriptor icons 1810. In this example, three second-level descriptor icons 1810 are shown based on the previous selections of first-level descriptor icons 1805. The user selects one or more of the second-level descriptor icons 1810 (e.g., "Raspberry" via selection 650-*s*). In the example of FIG. 19, the blend recipe is then updated based on the two first-level descriptors 1810 and the one second-level descriptor 1805.

In some embodiments, default descriptor categories and detailed descriptors are included in one of the databases. Dynamic descriptors may be specific to a particular liquid and may be generated based on expert sensory analysis, current scientific analysis and web scraping and/or 3rd party data relating to the particular liquid.

In this example, the selection of descriptors has been limited for illustrative purposes.

At any point even before selecting descriptors, the user can press "done" (e.g., a completion icon 1815) to advance to the next liquid lot.

Referring again to FIGS. 17-19, a variety of guided rankings may be implemented using the present system.

In some embodiments, the user selects a Guided Blending option, and the user is prompted to dispense a liquid lot or liquid blend. If the user has used the system before, the selected liquid lot or dynamically created liquid blend may be based on the user's current liquid phenotype (UHOEP). After the user has tasted the liquid, they can give a range of feedback about the liquid including but not limited to binary feedback, binary feedback with characteristic feedback and component axis ranking.

Based on this feedback, the system prompts the user to taste a dynamically created liquid blend that takes into account the feedback provided by the user. The same feedback process is repeated with the current liquid blend. Subsequent blends are created based on this same process.

The Guided Blending touchscreen interface guides a user through a range of liquids. Based on ranking and feedback, the system further refines the liquid blend to the user's taste. At any point, the user can transition to the slider system (as described above) to finish blending.

During the dispensing and feedback process, the user can rank the blends and eliminate blends that they do not like. This process can be facilitated by a Ranking Grid.

The Ranking Grid is a user interface that permits the user to change the preferred order of the liquid blends or delete disliked blends tasted during a tasting session. The user also has the options to include past blends in the Ranking Grid. In some embodiments, based on the aforementioned feedback process and the liquid blend order in the Ranking Grid, a liquid system may continue to create new blends and request feedback and ranking. During this process, the user's liquid phenotype is further refined.

If the user has not used the system before, the selected liquid lot or dynamically created liquid blend can be part of a series of wine lots and/or wine blends varying greatly in style. As the user gives feedback and contributes to the ranking grid, the system can dynamically refine and tailor the liquid blend to the user's liquid taste.

Component Axis Ranking is a touch based user interface that permits the user to plot their impression of a liquid on an x,y axis and rank each liquid by preference. The x and y axis each represent a characteristic of the selection of liquids that are being tasted. As one example, the x axis can represent the impression of ripeness in a wine ranging from green to extremely ripe. The y axis can represent the intensity of the wine ranging from light to big. If the user moved the graphical representation of the selected wine near the 0,0 position, this would represent the user's impression of a very light, unripe wine. If the user moved the selected representation of another wine to the upper right hand corner of the axis or the 100,100 position, this would represent a wine that the user felt was extremely ripe and extremely big. By long touching a selected wine, the user can also rank the selected wine and give a like/dislike rating.

Once the liquid lots have been evaluated, the user evaluation of the two attributes as well as their like feedback for each liquid lot is added to the user's HOEP.

At any point the user can redo the evaluation of any or all of the liquid lot components. This information may also be added to the user's HOEP.

Once a user has tasted through the selection of liquids created by the system and provided feedback, the system creates a new selection of liquids that are evaluated through this same system or the guided ranking process.

Component Axis Ranking permits the user to visualize the intensity of two key liquid characteristics in each liquid being tasted. Based on ranking and location, the system creates a series of personalized liquid blends. These feedback data are incorporated into the HOEP.

At any time during this process, the user can choose a blend and use that as the base blend in the Sliders Screen.

Figure 20:
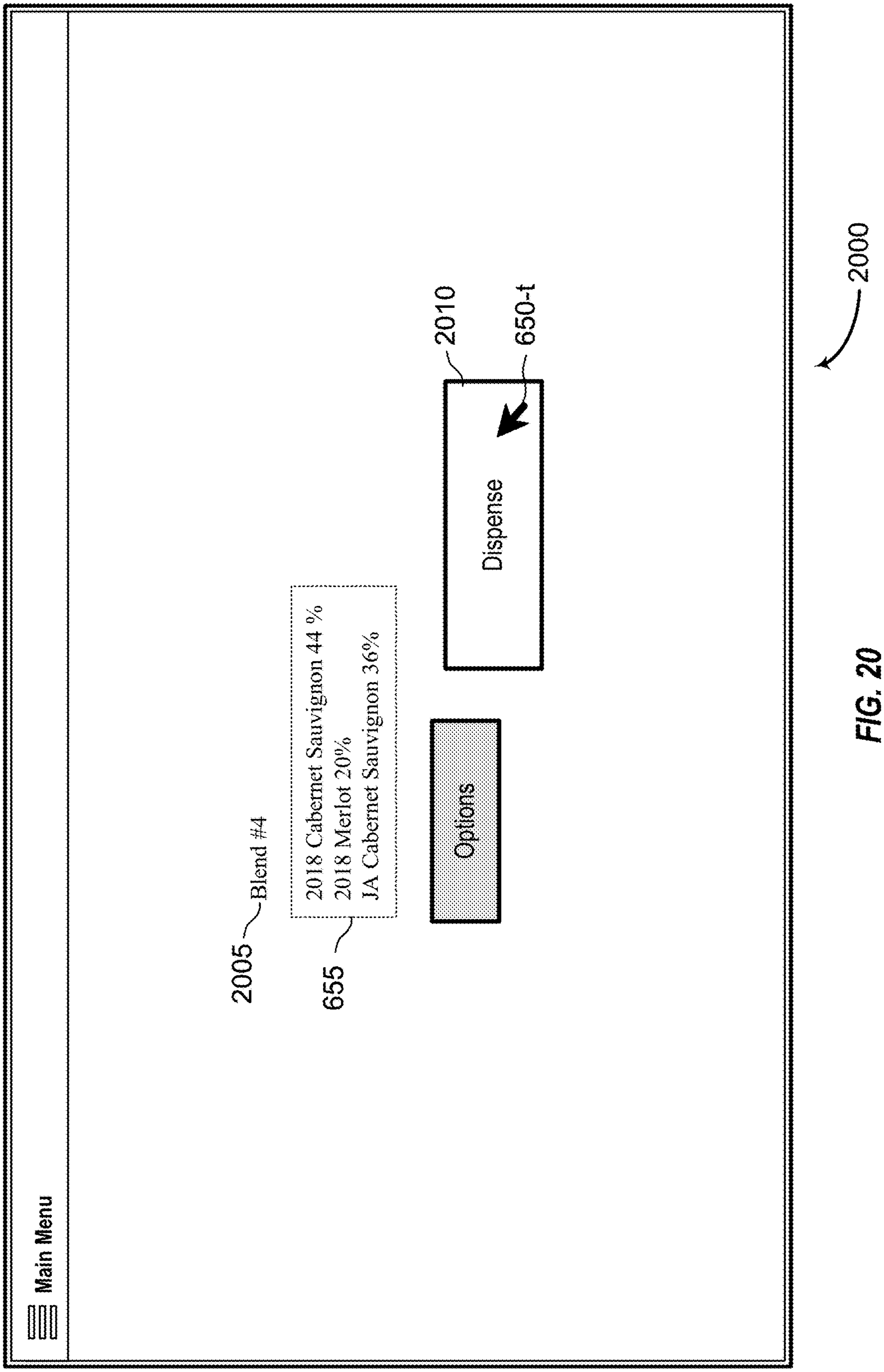

FIG. 20 shows an example of an exemplary screen display 2000 by a liquid blending system according to aspects of the present disclosure. In one aspect, display 2000 includes blend identity icon 2005, recipe graphical indication 655, dispense icon 2010, and selection 650-*t*. Display 2000 (e.g., an example display screen 2000, which may be displayed via a display of a liquid system as described herein, for example, with reference to FIGS. 1, 2, and 5) is an example of, or includes aspects of, the corresponding element described with reference to FIGS. 1, 2, and 5-19.

In FIG. 20, an exemplary display screen 2000 of a liquid blending system is shown for dispensing of a liquid according to one blend recipe.

A liquid blending system may display for any blend associated with the user (previously saved or created during the current blend session) a dispensing display screen. The dispensing display screen includes a blend name icon 2005 (a unique designation for that particular blend for that user), a blend recipe (e.g., recipe graphical indication 655) showing the different liquids included in the blend recipe and the proportion of each in the recipe, and a dispense icon 2010. The user selects the dispense icon 2010, via selection 650-*t*, to start the process of dispensing the liquid according to the blend recipe.

Figure 21:
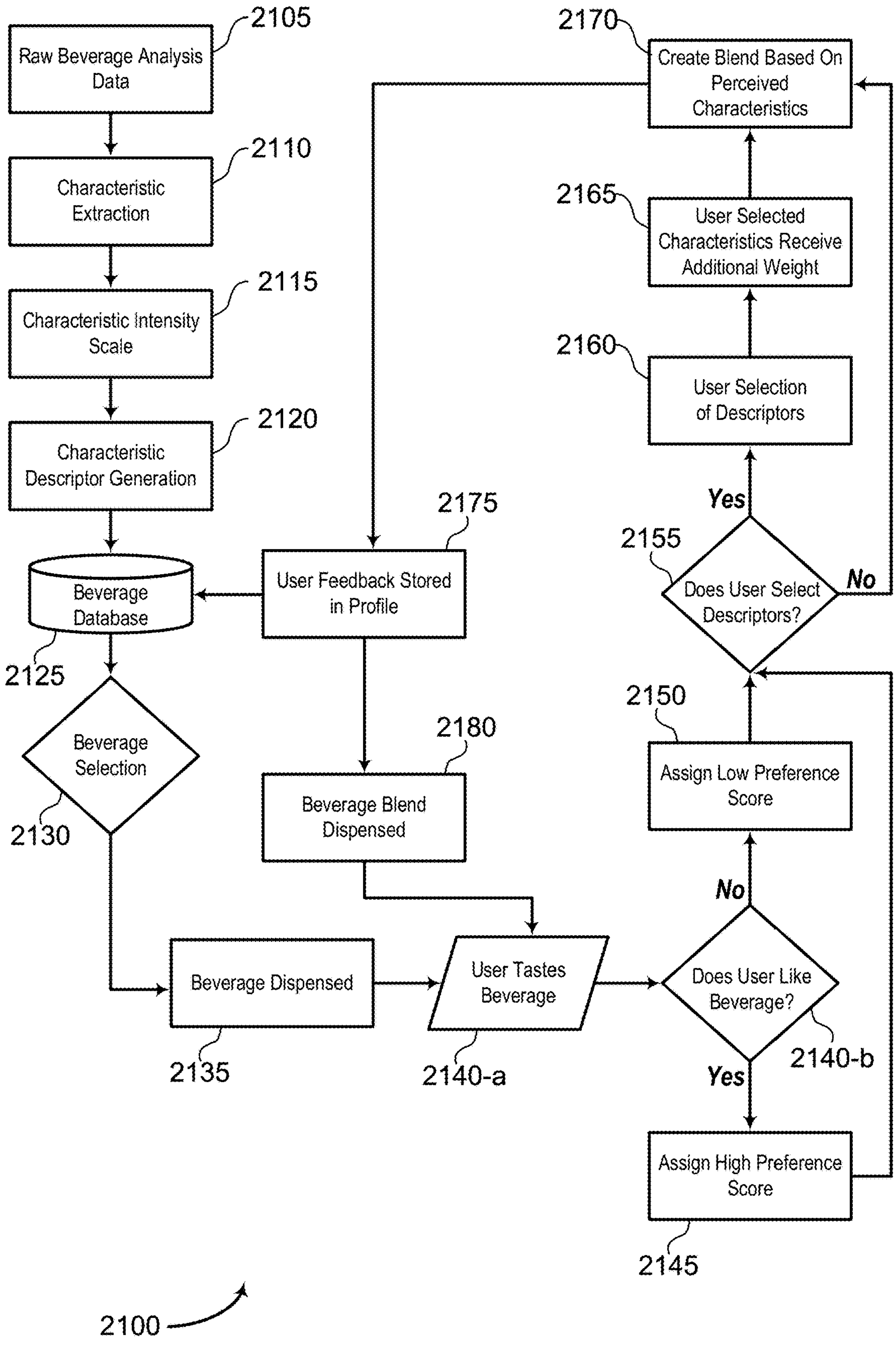
FIG. 21 shows an example of a flowchart of a guided liquid blending method according to one or more aspects of the present disclosure.

FIG. 21 shows an example of a flowchart 2100 of a guided liquid blending method according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2105, the system analyzes each liquid that can be included in a blended liquid (e.g., each available liquid may be analyzed, each liquid of the liquid system may be analyzed, each user selectable liquid may be analyzed, etc.). In some cases, the operations of this step refer to, or may be performed by, a liquid blending system as described with reference to FIGS. 1-5.

At operation 2110, the system determines and stores various characteristics of each liquid (e.g., such as sensory characteristics, availability characteristics, manufacturing characteristics, historical/categorical characteristics, etc.). In some cases, the operations of this step refer to, or may be performed by, a liquid blending system as described with reference to FIGS. 1-5.

At operation 2115, the system places (e.g., rates, ranks, scores, etc.) each characteristic of each liquid on a scale. For example, each characteristic may be placed on a scale based on stored characteristics of each liquid (e.g., such as on a sensory characteristic scale, an intensity scale, etc.). In some cases, the operations of this step refer to, or may be performed by, a liquid blending system as described with reference to FIGS. 1-5.

At operation 2120, the system generates (e.g., determines) word descriptors for each characteristic of each liquid. In some cases, the operations of this step refer to, or may be performed by, a liquid blending system as described with reference to FIGS. 1-5.

At operation 2125, the system stores analysis data and characteristic data for each liquid. In some cases, the operations of this step refer to, or may be performed by, a database as described with reference to FIGS. 1 and 2. In some cases, the operations of this step refer to, or may be performed by, a liquid blending system as described with reference to FIGS. 1-5.

At operation 2130, the system selects a blend of liquids from the set of liquids available. In some cases, the operations of this step refer to, or may be performed by, a user as described with reference to FIGS. 3 and 4. In some cases, the operations of this step refer to, or may be performed by, a user interface as described with reference to FIGS. 1 and 2.

At operation 2135, the system dispenses, in response to the selection, a serving of the selected liquid (e.g., for the user). In some cases, the operations of this step refer to, or may be performed by, a liquid dispensing system as described with reference to FIGS. 1-5. In some cases, the operations of this step refer to, or may be performed by, a nozzle as described with reference to FIGS. 3-5.

At operation 2140, the system evaluates the liquid (e.g., a user tastes the liquid). In some cases, the operations of this step refer to, or may be performed by, a user as described with reference to FIGS. 3 and 4.

In the next does user like liquid decision point, if the user selects "yes", the method proceeds to the next step of high preference score. At operation 2145, the system assigns high evaluation scores to generally perceived characteristics (e.g., the generally perceived characteristics of the tasted liquid are assigned high preference scores). In some cases, the operations of this step refer to, or may be performed by, a liquid blending system as described with reference to FIGS. 1-5.

If the user selects "no" at the liquid decision point, then the method proceeds to the step of low preference score. At operation 2150, the system assigns low evaluation scores to generally perceived characteristics (e.g., the generally perceived characteristics of the tasted liquid are assigned low preference scores). In some cases, the operations of this step refer to, or may be performed by, a liquid blending system as described with reference to FIGS. 1-5.

At the does user selected descriptors decision point, the user has the option to further describe their opinion of the tasted liquid. At operation 2155, the system optionally selects descriptors of the liquid. In some cases, the operations of this step refer to, or may be performed by, a user as described with reference to FIGS. 3 and 4. In some cases, the operations of this step refer to, or may be performed by, a user interface as described with reference to FIGS. 1 and 2. If the user does not select descriptors, the method proceeds to the blend creation step.

If the user selects descriptors, the method proceeds to the user selection of descriptors step. At operation 2160, the system selects descriptors for the evaluated liquid (e.g., a user may select descriptors for the liquid tasted by the user). In some cases, the operations of this step refer to, or may be performed by, a user as described with reference to FIGS. 3 and 4. In some cases, the operations of this step refer to, or may be performed by, a user interface as described with reference to FIGS. 1 and 2.

The method then proceeds to the weight additional characteristics step, where the characteristics associated with the descriptors selected by the user are assigned additional weight. At operation 2165, the system assigns additional weight for any user selected characteristics. In some cases, the operations of this step refer to, or may be performed by, a liquid blending system as described with reference to FIGS. 1-5. In some cases, the operations of this step refer to, or may be performed by, a liquid blending application as described with reference to FIGS. 1 and 2. In some cases, the operations of this step refer to, or may be performed by, a user interface as described with reference to FIGS. 1 and 2.

At operation 2170, the system determines a blend recipe using at least two of the available liquids. In some aspects, the system (e.g., a liquid blending application) may optimize the recipe based on increasing/maximizing characteristics rated positively by the user and reducing/minimizing characteristics rated negatively by the user. In some cases, the operations of this step refer to, or may be performed by, a liquid blending system as described with reference to FIGS. 1-5. In some cases, the operations of this step refer to, or may be performed by, a liquid blending application as described with reference to FIGS. 1 and 2.

At operation 2175, the system stores (e.g., in one or more databases) all data associated with the tasting, evaluation, and blend creation. In some cases, the operations of this step refer to, or may be performed by, a database as described with reference to FIGS. 1 and 2. In some cases, the operations of this step refer to, or may be performed by, a liquid blending system as described with reference to FIGS. 1-5.

At operation 2180, the system dispenses a serving of liquid according to the blend recipe. Next, the method proceeds again to the user tastes liquid step, and the process of tasting, evaluation, and recipe determining can repeat in one or more loops as the liquid blend recipe is further refined based on additional tasting/evaluation/blend cycles. In some cases, the operations of this step refer to, or may be performed by, a liquid dispensing system as described with reference to FIGS. 1-5. In some cases, the operations of this step refer to, or may be performed by, a user as described with reference to FIGS. 3 and 4. In some cases, the operations of this step refer to, or may be performed by, a user interface as described with reference to FIGS. 1 and 2. In some cases, the operations of this step refer to, or may be performed by, a liquid blending system as described with reference to FIGS. 1-5.

The guided blending process takes the user through one or more liquid tastings and collects feedback that is used to create personalized liquid blends for the user and to contribute to the user's HOEP. The guided blending process may include one or more of the aspects of FIGS. 16-20.

Referring again to FIGS. 1-21, the disclosed systems in some embodiments can dispense liquid and liquid blends and make liquid recommendations adapted to each consumer's personal taste.

In some aspects, for example, the disclosed liquid system removes many of the onerous parts of the blending process so a winemaker and an owner can focus on the important part of wine blending at any time the inspiration hits them. Once the wine lots are added to the Liquid blending and dispensing system, the winemaker can instantly brainstorm wine blends on the White Board. With one click, the winemaker can try the blend immediately or save it for another session. Liquid blending and dispensing systems may automatically save blends and allow liquid blenders (e.g., winemakers) to add notes, share blends with other team members, load blends to the White Board other sessions, etc. In some embodiments, liquid blending and dispensing system's remote option also allows users at different locations to brainstorm and share blends simultaneously.

Another aspect of the system may include creation of a holistic, dynamic, adaptive and unique profile of each liquid and consumer.

For wines, these profiles may include but are not limited to analytical data from wineries, independent labs and labs, organoleptic data from staff, various wine critics and general consumers, and terroir related data including climate, soil and exposure data.

For consumers, these profiles may include but are not limited to system based consumer wine tasting feedback, wine purchase history, consumer feedback on purchased wines.

Using machine learning and Deep Learning algorithms, liquid systems may create personalized liquids (e.g., wines) for each consumer in one part by identifying and quantifying overlapping characteristics of liquids and the consumer. In another part, liquid systems may use such characteristics to create this liquid by creating a blend of components most similar to the underlying characteristics of each overlapping liquid type. In some aspects, liquid systems may then validate and refine such liquids (e.g., liquid blends) based on the consumer's feedback.

In some embodiments, third party data partners may augment liquid systems, liquid/blend profiles, and consumer profiles to further refine overlapping characteristics. For example, by using the system with additional data (e.g., from Ancestry.com®), a DNA profile may be determined that prefers lighter, earthy wines. As another example (e.g., by collaborating with data providers such as Facebook®), a certain customer or demographic may be determined to prefer a certain type of liquid on a certain day with a certain person or group of people. As another example (e.g., by collaborating with the above example partners coupled with, for example, Tripadvisor®), it might be determined that cilantro loving, Tripadvisor reviewers that travel to Tuscany once a year love medium-bodied somewhat fruity liquids.

In some embodiments, in addition to producing personalized liquids for each consumer, the results from a liquid system can also be used to make liquid recommendations. In the case of wine critics, a liquid system could recommend a wine critic to follow based on mutual taste. It could also recommend liquid brands and specific liquids that share the consumer's flavor profiles. This recommendation system could be used to augment or replace traditional liquid buyers.

In some embodiments, in one version of a liquid system, the initial consumer profile may be created through an interactive program that guides the consumer through tasting a variety of liquid samples. During the tasting, a liquid system dispenses the liquid sample and obtains customer feedback. Based on feedback from the tasting, a liquid system creates and dispenses a selection of liquid personalized to the consumer's taste. Based on consumer feedback of the selection, a liquid system further refines the selection and produces additional selections of personalized liquids.

In other versions of liquid systems, the program consists of an interactive screen that permits the consumer to experiment in creating his or her personalized liquid. In this version, the consumer can drag representations of each liquid component on the screen to change blend percentages. At any point, the consumer can dispense a sample of the liquid blend. Each blend may be recorded in the liquid system so that the consumer can review his or her tasting history. As the consumer experiments with the blends, he or she may eventually find a blend of interest and discover his or her taste preferences. As the consumer is experimenting, the Deep Learning system may be evaluating the consumer's approach to blending. The Deep Learning system is also comparing the data from other consumers. Understanding this data can also be used to further enhance the liquid personalization system by discovering how consumers arrive at their decision. Even in this freestyle version, a liquid system may guide the consumer to his or her personalized liquid.

Another version of an example liquid system gives the consumer a selection of liquids to taste. The consumer chooses his or her favorite liquid and then a liquid system gives the consumer a range of options for customizing the liquid: e.g. adding or subtracting the fruit, tannin, oak levels through an interactive screen.

In some embodiments, at every point in the process, a liquid system can dispense and record these liquid options in real time for each user.

In some embodiments, all versions of the liquid system may be controlled by the liquid blending application that adapts dispensing to the particular version. In addition to the liquid blending application, each version of the liquid system may be made up of a liquid supply component (e.g., a beverage supply component, such as a liquid supply component), a device control component, a device component and a dispensing component. Several versions of each component type exist and may be used in part or in combination with other component types In one version of the liquid supply component (e.g., in examples wherein the liquid supply component is a wine supply component), a stopper is placed in a traditional 0.375-1.5 L wine bottle. The stopper consists of two tubes. One tube supplies an inert gas such as Nitrogen or Argon. The other tube receives the wine. Once the stopper has been placed in the bottle, the bottle may be turned upside down and placed into an apparatus whose form secures the stopper in the bottle. At the other end, a spring loaded disc applies adequate tension to secure the bottle while under pressure from the inert gas supply tube. The disc may be shaped in order to accommodate bottles ranging from 0.375 to 1.5 L bottles.

In a similar version of the liquid supply component, a cylindrical or rectangular receptacle grid accommodates canned or boxed liquid packaging. The canned or boxed liquid may be placed into the receptacle. At the base of the receptacle may be two stainless steel tubes fashioned to pierce the can or box. By applying light pressure to the packaging, the can or box may be pierced. A fastener on the top of the receptacle ensures that the can or box remains secured to the tubes as pressure is applied.

Another version may be adapted to supplying liquid from "soda kegs" or Cornelius type kegs.

In other versions of the liquid supply component, the inert gas component may be used to replace the volume of liquid being dispensed but does not create a significant positive pressure. These systems have been adapted for larger format dispensing including carboys, wine barrels and wine tanks.

In some embodiments, the liquid blending application sends instructions to a device controller. The liquid blending application adapts the device controller instructions to the type of device components and dispensing components.

In some versions of the device controller, device components and dispensing components, the liquid blending application self calibrates flow rates to ensure dispensing accuracy.

In some embodiments, in one version, the controller may be regulating inert gas pressure and liquid dispensing valves. In some embodiments, in another version, the controller may be regulating peristaltic pump speed.

In some embodiments, the dispensing system includes a rectangular or cylindrical manifold. Each individual liquid supply line may be attached to the sides of the manifold. The interior of the manifold may be cylindrical and fashioned with a corkscrew type ridging. An inert gas supply line may be attached to the top of the manifold. The dispensing nozzle may be attached to the bottom of the manifold. The corkscrew ridging ensures that the liquid may be adequately mixed as it is being dispensed. The inert gas ensures that the liquid is not exposed to oxygen during the mixing process.

In some embodiments, in addition to dispensing personalized liquid into a glass or bottle(s), a liquid system can also generate a personalized liquid label including the percentages and provenance of the liquids, a personalized photo and message or title.

In some embodiments, the user interface exists in multiple versions including on smartphone, touchscreen, web application, network and standalone computer.

In some embodiments, a liquid system also allows real time sharing of blends between devices. For example, a user in Los Angeles could share a blend with a user in New York City and simultaneously taste the same blend.

In some embodiments, based on the business's needs, a wide range of liquid blends can be created from a few base liquids. For example, over 20 very different on-demand wines by the glass and by the bottle can be created from 5 base wine blends.

In some examples, customers can order the on-demand liquids from a traditional liquid list. The staff simply select the liquid and quantity from our system's user interface. The system dispenses the liquid in seconds and records the transaction in the Point of Sale system.

In some cases, tablet or smartphone interfaces may be provided that permit the customer to place an order directly from the device and keep track of their past purchases and preferences.

In such embodiments, the business may, for example, eliminate 75% of its wine by the glass stock keeping units (sku's). Since the system accurately dispenses the wine, staff overpours may be eliminated. Since the dispensing system protects the wine, wine spoilage may be virtually eliminated.

In some embodiments, one or more of the plurality of databases may, along with the liquid blending application, implement Holistic, Open-Ended, Evolving, Phenotyping (HOEP) systems, Key Element Ranking and Aggregate Correlated Influencer Models. In these and other embodiments of a liquid system, Deep Learning and other algorithms may be used, incorporated into the liquid blending application and/or implemented in one or more code segments outside of the liquid blending application, to produce wines and wine recommendations tailored to an individual's taste.

Phenotyping was first coined in the early 20th century as the process of describing the observable and measurable phenomena of organisms. The liquid blending and dispensing system has built on this idea to create the concept of Holistic, Open-Ended, Evolving Phenotyping or HOEP. HOEP posits that there are measurable and observable characteristics that the phenotype subject influences or that cause the phenotype subject to be influenced. HOEP goes on to state that there are measurable and observable characteristics whose influence by or on the phenotype subject are unknown at present but may become known at a future time. HOEP further postulates that there are data that have not yet been characterized that the phenotype subject may influence or may influence the phenotype subject.

In some embodiments, Holistic, Open-Ended, Evolving Phenotyping (HOEP) may address the aforementioned cases. Holistic is meant to include any and all possible data points related to the phenotype subject. Open-Ended refers to the concept that this phenotype has a constant addition of new data points and new information. Evolving is meant to explain that the methods to collect and distill data and characteristics are ever changing. This method of phenotyping is meant to encompass every possible characteristic and related data point of the phenotype subject, even data that may not yet be understood. As a result, HOEP creates extremely large compilations of both categorized and uncategorized data.

In some embodiments, the liquid blending and dispensing system may be configured to create HOEPs of wines, users and third party datasets. It also creates HOEPs of groups of wines, users, and third party datasets. Real time wine tasting feedback from the user interface may be fed through Deep Learning and/or other unique algorithms. These algorithms discover relationships between user feedback, wine HOEPs and 3rd Party HOEPs. Both user feedback and statistically significant relationships between other HOEPs become part of the user's HOEP.

In some embodiments, the liquid blending and dispensing system's Key Element Ranking method uses Deep Learning algorithms to continually refine weighted lists of statistically significant characteristics for each HOEP. At any given instance, these Key Elements may be the most influential characteristics of the HOEP. Liquid blending and dispensing system's Aggregate Correlated Influencer Model (ACIM) uses Deep Learning to find relationships between HOEPs.

In some embodiments, the ACIM continually evaluates the weighted relationships between the HOEPs. Statistically significant relationships may be incorporated into the personalized liquid blending and liquid recommendation system.

In some examples, each liquid (e.g., each wine) included in the liquid system may be analyzed for (or receives data from an external source for) sensory impact using current Oenological and Organoleptic scientific analysis, expert tasting methods and panels and a proprietary rating system. These analyses seek to obtain as complete an analytical description as possible of every sensory aspect detectable by humans that makes each liquid unique.

In some aspects, these characteristic data may be added to a liquid's HOEP. Any and all forms of available categorical data may be also added to the liquid's HOEP including but not limited to: grape variety, region, vintage, soil type, vine age, growing conditions, climate, root Stock, scion, third party data, critic scores, critic descriptions, user ratings, user descriptions, and price among other examples.

In some embodiments, the User interface, blending system and dispensing system permit the user to taste a selection of liquids or liquid blends and provide feedback on this selection in real time. The real time user feedback may be fed through Deep Learning algorithms and/or other algorithms to identify relationships between the feedback and the characteristics of the liquid's HOEP. Statistically significant liquid characteristics may be identified and weighted. These weighted characteristics or Key Elements become the building blocks of the user's HOEP.

In some aspects, the liquid blending and dispensing system then dispenses a selection of liquid blends in real time for the user based on these weighted characteristics. In some aspects, based on real time user feedback, The liquid blending and dispensing system refines the weighted characteristics and in turn dispenses a new selection of blends. At this point, a liquid system may prompt the user to choose their favorite liquid and rate their level of satisfaction with the final blend. In some aspects, based on the level of satisfaction, a liquid system may assign a confidence factor to the selected liquid blend and adjust the weights on Key Elements.

At first glance, 3rd party user data may appear to have nothing to do with a user's liquid preference. By using Deep Learning, the liquid blending and dispensing system finds relationships between 3rd party data and a user's liquid preference as well as 3rd party data and groups of users.

Holistic, Open-Ended, Evolving, Phenotyping, Key Element Ranking and the Aggregate Correlated Influencer Model may be also used with 3rd party data to discover relationships between these data, liquid HOEP and user HOEP. Statistically significant characteristics may be incorporated into the liquid production and liquid recommendation system.

Deep Learning Algorithms may be employed to determine and rank key characteristics within each phenotype category. Deep Learning Algorithms may be implemented to determine relationships and their weight between liquid, user and 3rd Party HOEPs and their characteristics as well as between HOEP groups discovered by Deep Learning Algorithms. The Aggregate Correlated Influencer Model may be used to personalize liquid and make personalized liquid recommendations. Weighted relationships may be the foundation of the Aggregate Correlated Influencer Model (ACIM). The ACIM analyses and tracks the relationships between these weighted relationships to determine the level of correlation and influence of each of these overlapping characteristics with a user's actual preferences. The ACIM continually refines personalized liquid blends and liquid recommendations for the user and groups of users. Future user feedback of the personalized blends and recommendations may be used to validate and fine tune phenotyping, key element ranking and the ACIM. The liquid blending and dispensing system's software, including but not limited to the liquid blending application, controls the user interface, the equipment control and liquid dispensing systems, the data collection and interpretation and the personalized liquid blending and liquid recommendation systems.

In some aspects, one or more (e.g., and any combination) of the following attributes may be found in the varying described example embodiments of the liquid system, including: select user; user history; dispense selected blend; a database interface and control system; user; wine; partner; a dynamic lot system; active wine lots can be changed on the fly; a dynamic equipment control system; wine dispensing may be immediate whether controlled by a personal device, a touchscreen or other device; a dynamic wine dispensing system; wine blends can be changed through a user interface or through Deep Learning based algorithms and may be dispensed at the touch of a button; wine blending and wine recommendation algorithms; whiteboard; as lots are added and subtracted from the whiteboard, the blend percentages are dynamically updated; Deep Learning algorithms; to accelerate the process of creating a personalized blend for a user; to group wines and wine blends into groups based on relationships in user feedback and wine phenotypes; to find common wine preferences among a group of people; to find preference indicators; wine critic that has same taste as user; DNA trait that correlates with a certain user wine preference; a dynamic labeling system; user name and image may be used to dynamically create personalized wine labels; wine labeling system dynamically generates lot percentages, vintage, alcohol content and other label information from the user selected wine blend; a dynamic calibration system; system calibrates itself based on flow rate and flow rate change; a remote collaborative blending system; users located remotely can taste and share blends simultaneously; apparatus; wine dispensing apparatus; peristaltic system; tap system; cartridge system; and wine preservation apparatus.

In some aspects, one or more (e.g., and any combination) of innovations of the various described example embodiments of the liquid system may include: interactive touchscreen based wine tasting experience; touchscreen real time wine blending; touchscreen real time label customization; Deep Learning to produce personalized wine blends and wine recommendations; user Interface to produce real time personalized wine blends; user Interface to produce real time wine labels; dynamic bottling and labeling system that produces custom wine and labels at the bottle by bottle level in real time; dynamic wine blending system that blends wine in real time; system that records wine blends in real time; system that personalizes wine blends to user's taste preference in real time; system that uses Deep Learning to personalize wine blends to user's taste preference; system that creates personalized wine recommendations and wine blends based on user feedback of wines dispensed by system in real time; system that creates personalized wine recommendations and wine blends based on user feedback of analyzed wines; system that employs user feedback of analyzed wines to make purchasing and inventory recommendations for professional wine buyers; automated wine buying system based on HOEP; consumer wine blending apparatus; kiosk wine blending apparatus; restaurant and bar wine blending apparatus; winery wine blending apparatus; same systems for Scotch and other blended liquids; real time, automatic, creation of personalized wine blends and recommendations based on immediate consumer feedback of tasting selection of scientifically analyzed and expert evaluated wines dispensed by Liquid blending and dispensing system; real time, interactive, automated wine tasting experience that creates personalized wine blends and wine recommendations using proprietary algorithms and Deep Learning; Deep Learning to determine key characteristics of wine preference for each user; Deep Learning to determine key characteristics of data partners that determine wine preference of user, users and user groups; instant and dynamic wine blend dispensing; real time wine tasting feedback used to dynamically refine wine blends; Deep Learning algorithms used to find relationships between users feedback, wine preferences and partner data in order to enhance and accelerate the personalization of wine blends and recommendations; Deep Learning algorithms to find common wine blends and recommendations between groups of people; simultaneous tasting of wine blends with users located at different locations; remote real time wine tasting; user interface to dynamically and instantly produce wine blends; user interface to provide feedback on wines dispensed in order to personalize wines to user's taste preferences; dynamically produce wine on-premise and off-premise tailored to a customer's personal taste using the selection of wines available at premise; and commercial aspect of system for wholesalers and retailers purchasing and logistics decisions.

Figure 22:
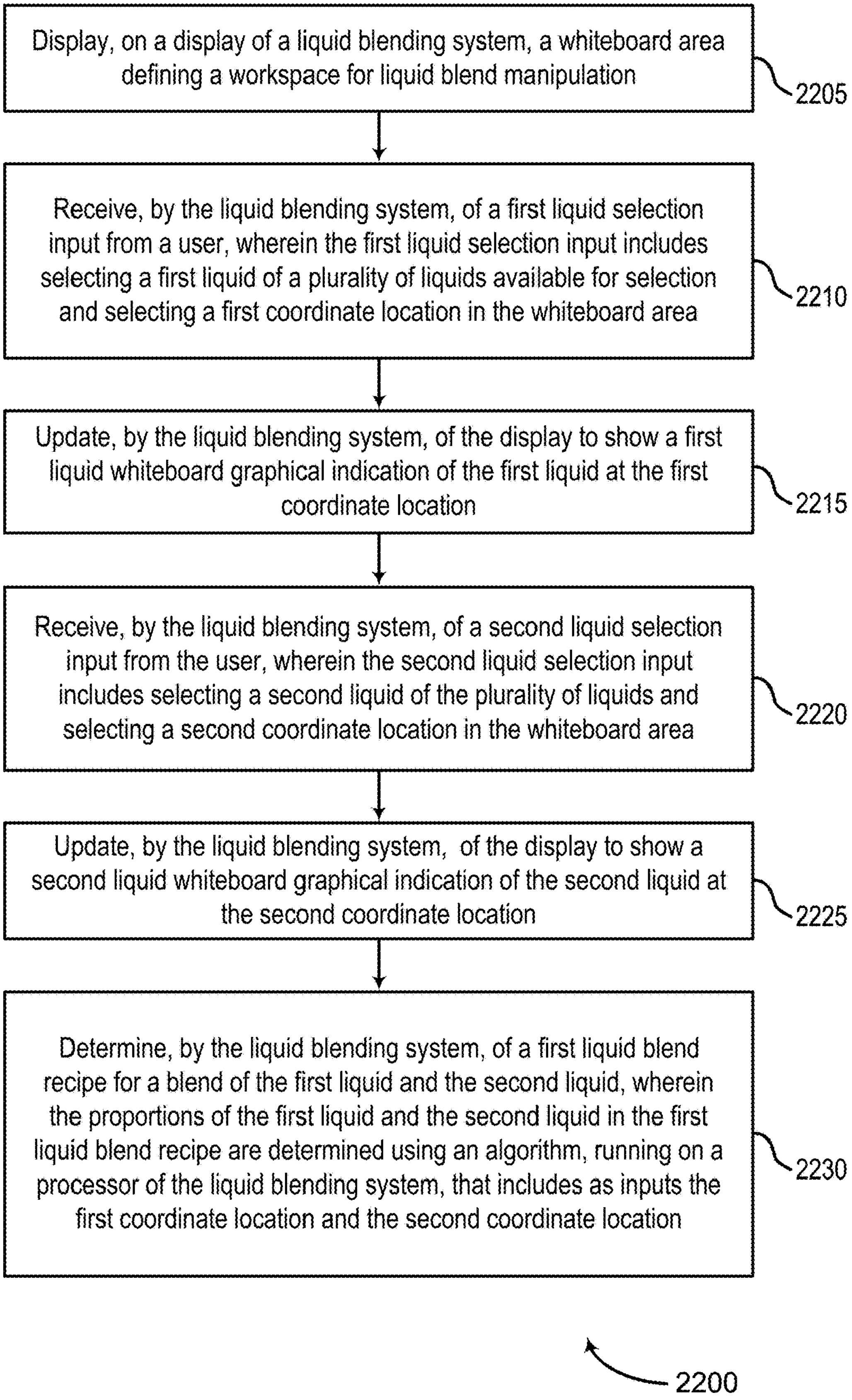
FIG. 22 shows an example of a liquid blending and dispensing method according to one or more aspects of the present disclosure.

FIG. 22 shows an example of a method 2200 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2205, the system displays a whiteboard area defining a workspace for liquid blend manipulation. In some cases, the operations of this step refer to, or may be performed by, a display as described with reference to FIGS. 1, 2, and 5-20. In some cases, the operations of this step refer to, or may be performed by, a whiteboard area as described with reference to FIGS. 6-13.

At operation 2210, the system receives of a first liquid selection input from a user, where the first liquid selection input includes selecting a first liquid of a set of liquids available for selection and selecting a first coordinate location in the whiteboard area. In some cases, the operations of this step refer to, or may be performed by, a user interface as described with reference to FIGS. 1 and 2. In some cases, the operations of this step refer to, or may be performed by, a liquid blending system as described with reference to FIGS. 1-5.

At operation 2215, the system updates of the display to show a first liquid whiteboard graphical indication of the first liquid at the first coordinate location. In some cases, the operations of this step refer to, or may be performed by, a display as described with reference to FIGS. 1, 2, and 5-20. In some cases, the operations of this step refer to, or may be performed by, a liquid selection graphical indication as described with reference to FIGS. 6-13.

At operation 2220, the system receives of a second liquid selection input from the user, where the second liquid selection input includes selecting a second liquid of the set of liquids and selecting a second coordinate location in the whiteboard area. In some cases, the operations of this step refer to, or may be performed by, a user interface as described with reference to FIGS. 1 and 2. In some cases, the operations of this step refer to, or may be performed by, a liquid blending system as described with reference to FIGS. 1-5.

At operation 2225, the system updates of the display to show a second liquid whiteboard graphical indication of the second liquid at the second coordinate location. In some cases, the operations of this step refer to, or may be performed by, a display as described with reference to FIGS. 1, 2, and 5-20. In some cases, the operations of this step refer to, or may be performed by, a liquid selection graphical indication as described with reference to FIGS. 6-13.

At operation 2230, the system determines of a first liquid blend recipe for a blend of the first liquid and the second liquid, where the proportions of the first liquid and the second liquid in the first liquid blend recipe are determined using an algorithm, running on a processor of the liquid blending system, that includes as inputs the first coordinate location and the second coordinate location. In some cases, the operations of this step refer to, or may be performed by, a recipe graphical indication as described with reference to FIGS. 7-15, and 20. In some cases, the operations of this step refer to, or may be performed by, a liquid blending system as described with reference to FIGS. 1-5.

Figure 23:
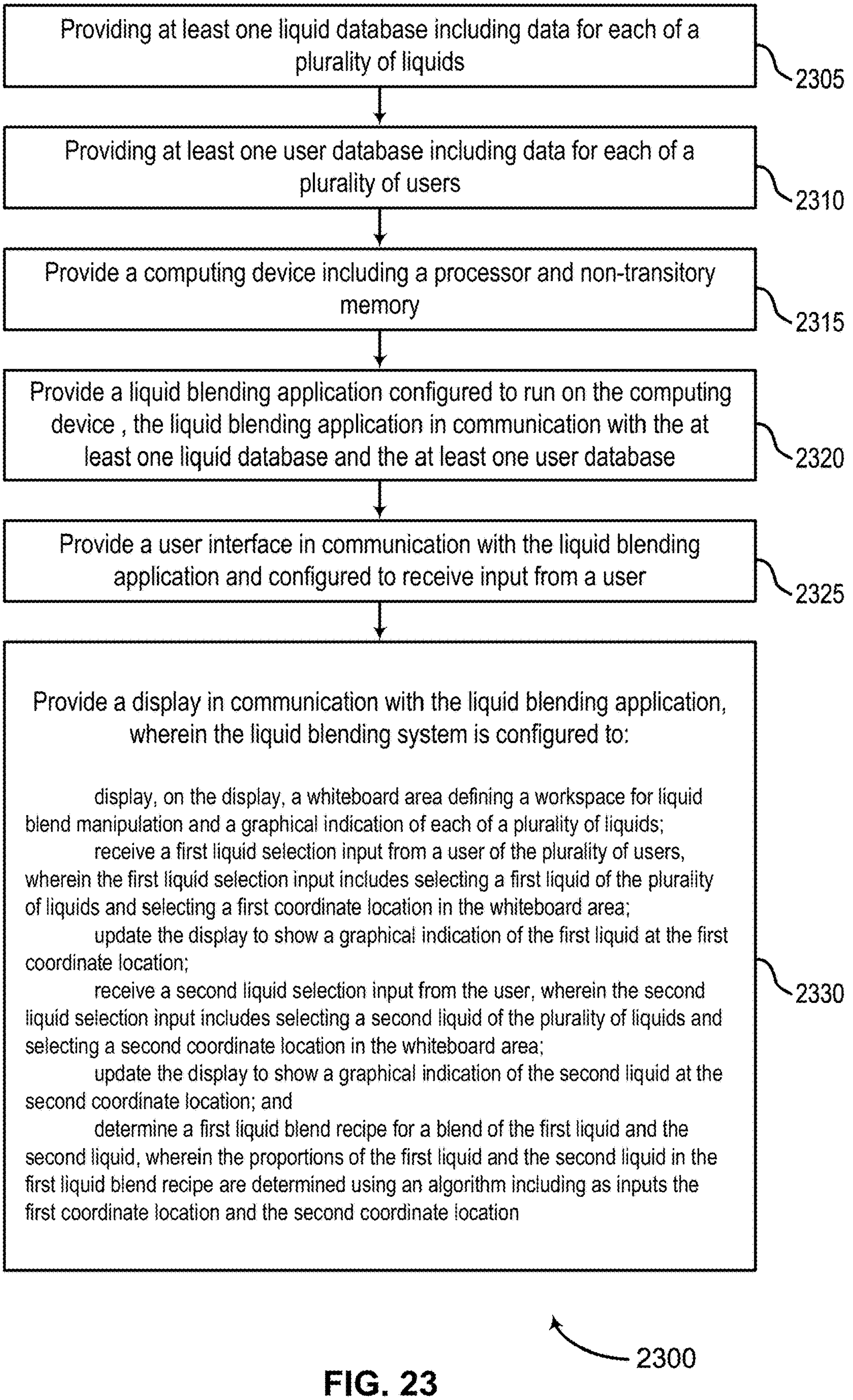
FIG. 23 shows an example of a method for providing a customizable liquid blending and liquid dispensing system according to one or more aspects of the present disclosure.

FIG. 23 shows an example of a method 2300 for providing a customizable liquid blending and liquid dispensing system according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2305, the system provides at least one liquid database including data for each of a set of liquids. In some cases, the operations of this step refer to, or may be performed by, a database as described with reference to FIGS. 1 and 2.

At operation 2310, the system provides at least one user database including data for each of a set of users. In some cases, the operations of this step refer to, or may be performed by, a database as described with reference to FIGS. 1 and 2.

At operation 2315, the system provides a computing device including a processor and non-transitory memory. In some cases, the operations of this step refer to, or may be performed by, a processor and memory as described with reference to FIGS. 1 and 2.

At operation 2320, the system provides a liquid blending application configured to run on the computing device, the liquid blending application in communication with the at least one liquid database and the at least one user database. In some cases, the operations of this step refer to, or may be performed by, a liquid blending application as described with reference to FIGS. 1 and 2.

At operation 2325, the system provides a user interface in communication with the liquid blending application and configured to receive input from a user. In some cases, the operations of this step refer to, or may be performed by, a user interface as described with reference to FIGS. 1 and 2. In some cases, the operations of this step refer to, or may be performed by, a liquid blending application as described with reference to FIGS. 1 and 2. In some cases, the operations of this step refer to, or may be performed by, a user as described with reference to FIGS. 3 and 4.

At operation 2330, the system provides a display in communication with the liquid blending application. In some aspects, the liquid blending system is configured to: display, on the display, a whiteboard area defining a workspace for liquid blend manipulation and a graphical indication of each of a set of liquids; and receive a first liquid selection input from a user of the set of users, where the first liquid selection input includes selecting a first liquid of the set of liquids and selecting a first coordinate location in the whiteboard area. In some aspects, the liquid blending system is configured to: update the display to show a graphical indication of the first liquid at the first coordinate location; and receive a second liquid selection input from the user, where the second liquid selection input includes selecting a second liquid of the set of liquids and selecting a second coordinate location in the whiteboard area. In some aspects, the liquid blending system is configured to: update the display to show a graphical indication of the second liquid at the second coordinate location; and determine a first liquid blend recipe for a blend of the first liquid and the second liquid, where the proportions of the first liquid and the second liquid in the first liquid blend recipe are determined using an algorithm including as inputs the first coordinate location and the second coordinate location. In some cases, the operations of this step refer to, or may be performed by, a display as described with reference to FIGS. 1, 2, and 5-20. In some cases, the operations of this step refer to, or may be performed by, a liquid blending system as described with reference to FIGS. 1-5.

Figure 24:
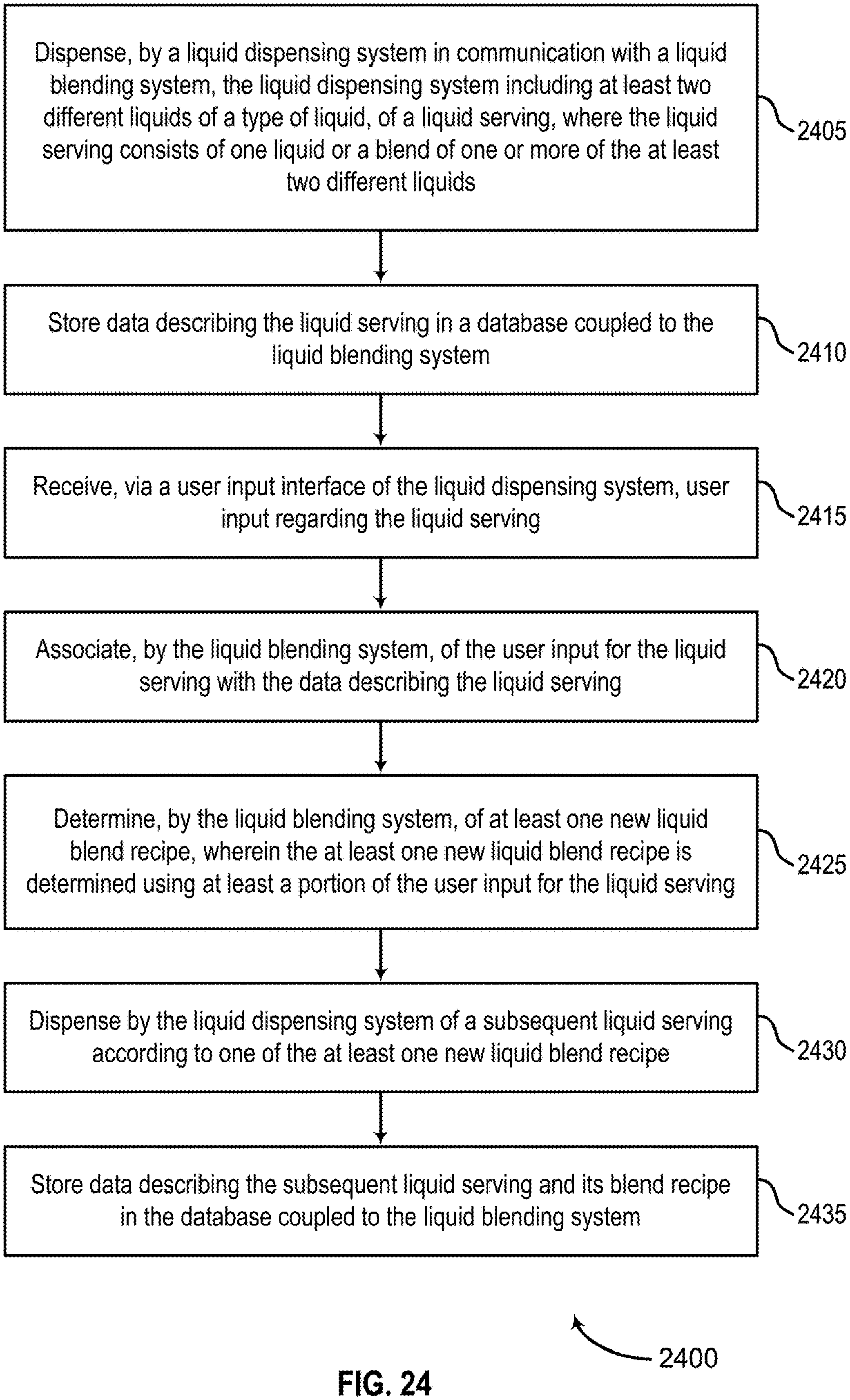
FIG. 24 shows an example of a liquid blending and dispensing method according to one or more aspects of the present disclosure.

FIG. 24 shows an example of a method 2400 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2405, the system dispenses, by a liquid dispensing system, of a liquid serving, where the liquid serving consists of one liquid or a blend of one or more of at least two different liquids of a type of liquid, where the liquid dispensing system is in communication with a liquid blending system, and where the liquid dispensing system includes the at least two different liquids. In some cases, the operations of this step refer to, or may be performed by, a blended liquid as described with reference to FIGS. 3 and 4. In some cases, the operations of this step refer to, or may be performed by, a liquid dispensing system as described with reference to FIGS. 1-5.

At operation 2410, the system stores data describing the liquid serving in a database coupled to the liquid blending system. In some cases, the operations of this step refer to, or may be performed by, a database as described with reference to FIGS. 1 and 2. In some cases, the operations of this step refer to, or may be performed by, a liquid blending system as described with reference to FIGS. 1-5.

At operation 2415, the system receives, via a user input interface of the liquid dispensing system, user input regarding the liquid serving. In some cases, the operations of this step refer to, or may be performed by, a user interface as described with reference to FIGS. 1 and 2. In some cases, the operations of this step refer to, or may be performed by, a liquid dispensing system as described with reference to FIGS. 1-5.

At operation 2420, the system associates of the user input for the liquid serving with the data describing the liquid serving. In some cases, the operations of this step refer to, or may be performed by, a liquid blending system as described with reference to FIGS. 1-5.

At operation 2425, the system determines of at least one new liquid blend recipe, where the at least one new liquid blend recipe is determined using at least a portion of the user input for the liquid serving. In some cases, the operations of this step refer to, or may be performed by, a liquid blending system as described with reference to FIGS. 1-5. In some cases, the operations of this step refer to, or may be performed by, a recipe graphical indication as described with reference to FIGS. 7-15, and 20.

At operation 2430, the system dispenses by the liquid dispensing system of a subsequent liquid serving according to one of the at least one new liquid blend recipe. In some cases, the operations of this step refer to, or may be performed by, a blended liquid as described with reference to FIGS. 3 and 4. In some cases, the operations of this step refer to, or may be performed by, a liquid dispensing system as described with reference to FIGS. 1-5.

At operation 2435, the system stores data describing the subsequent liquid serving and its blend recipe in the database coupled to the liquid blending system. In some cases, the operations of this step refer to, or may be performed by, a database as described with reference to FIGS. 1 and 2. In some cases, the operations of this step refer to, or may be performed by, a liquid blending system as described with reference to FIGS. 1-5.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A liquid blending method, comprising:

displaying, on a display of a liquid blending system, a whiteboard area defining a workspace for liquid blend manipulation;

receiving, by the liquid blending system, of a first liquid selection input from a user, wherein the first liquid selection input includes selecting a first liquid of a plurality of liquids available for selection and selecting a first coordinate location in the whiteboard area;

associating, by the liquid blending system, of the first liquid with the first coordinate location;

in response to receiving the first liquid selection input, updating, by the liquid blending system, of the display to show a first liquid whiteboard graphical indication of the first liquid, wherein the first liquid graphical indication is shown at the first coordinate location;

receiving, by the liquid blending system, of a second liquid selection input from the user, wherein the second liquid selection input includes selecting a second liquid of the plurality of liquids and selecting a second coordinate location in the whiteboard area;

associating, by the liquid blending system, of the second liquid with the second coordinate location;

in response to receiving the second liquid selection input, updating, by the liquid blending system, of the display to show, in addition to the first liquid whiteboard graphical indication of the first liquid at the first coordinate location, a second liquid whiteboard graphical indication of the second liquid, wherein the second liquid whiteboard graphical indication of the second liquid is shown at the second coordinate location; and determining, by the liquid blending system, of a first liquid blend recipe for a blend of the first liquid and the second liquid, wherein the proportions of the first liquid and the second liquid in the first liquid blend recipe are determined using an algorithm, running on a processor of the liquid blending system, that includes as inputs the first coordinate location and the second coordinate location.

2. The liquid blending method of claim 1, further comprising:

blending, by a liquid dispensing system in communication with the liquid blending system and including the first liquid and the second liquid, a first liquid serving according to the first liquid blend recipe; and dispensing, by the liquid dispensing system, of the first liquid serving.

3. The liquid blending method of claim 2, further comprising:

after dispensing the first liquid serving, receiving, by the liquid blending system, of user input evaluating the first liquid serving and determining a second liquid blend recipe based at least on the first coordinate location, the second coordinate location, and the user input; and updating the display to show a graphical indication of the second liquid blend recipe.

4. The liquid blending method of claim 3, wherein the user input comprises scoring by the user of at least one sensory or chemical characteristic of the first liquid serving.

5. The liquid blending method of claim 3, wherein the user input comprises selecting by the user of at least one descriptor term, wherein each descriptor term correlates to a sensory or chemical characteristic.

6. The liquid blending method of claim 5, wherein the determining of the second liquid blend recipe further comprises additional weighting of each sensory or chemical characteristic correlating to the at least one selected descriptor terms.

7. The liquid blending method of claim 6, further comprising storing of the user input in a liquid blend database in communication with the liquid blending system.

8. The liquid blending method of claim 3, further comprising:

blending, by the liquid dispensing system, of a second liquid according to the second liquid blend recipe; and dispensing, by the liquid dispensing system, of the second liquid serving.

9. The liquid blending method of claim 1, further comprising:

associating, by the liquid blending system, the first liquid blend recipe with the user and storing the first liquid blend recipe and the association in a liquid blend database in communication with the liquid blending system.

10. The liquid blending method of claim 1, wherein data associated with the user is stored in a user profile of a liquid blend database in communication with the liquid blending system, and wherein the algorithm further includes as input at least one datum from the user profile.

11. The liquid blending method of claim 1, wherein the first liquid whiteboard graphical indication and the second liquid whiteboard graphical indication further includes a percentage of the first liquid in the first liquid blend recipe and the second liquid whiteboard graphical indication and the second liquid whiteboard graphical indication further includes a percentage of the second liquid in the first liquid blend recipe.

12. The liquid blending method of claim 1, wherein, for each liquid, the proportion of that liquid in the first liquid blend corresponds only with the value of that liquid's coordinate location on the y-axis of the whiteboard area.

13. The liquid blending method of claim 1, further comprising, prior to receiving of the first liquid selection input, of displaying on the display of the liquid blending system a graphical indication for each of the plurality of liquids.

14. The liquid blending method of claim 1, further comprising:

receiving, by the liquid blending system, of a third liquid selection input from a user, wherein the third liquid selection input includes selecting a third liquid of the plurality of liquids and selecting a third coordinate location in the whiteboard area;

associating, by the liquid blending system, of the third liquid with the third coordinate location;

in response to receiving the third liquid selection input, updating, by the liquid blending system, of the display to show, in addition to the first liquid whiteboard graphical indication of the first liquid at the first coordinate location and the second liquid whiteboard graphical indication of the second liquid at the second coordinate location, a third liquid whiteboard graphical indication of the third liquid, wherein the third liquid whiteboard graphical indication of the third liquid is shown at the third coordinate location; and determining, by the liquid blending system, of a second liquid blend recipe for a blend of the first liquid, the second liquid, and the third liquid, wherein the proportions of the first liquid, the second liquid, and the third liquid in the second liquid blend recipe are determined using the algorithm, including as input to the algorithm the first coordination location, the second coordination location, and the third coordinate location.

15. The liquid blending method of claim 1, further comprising:

displaying, on the display of the liquid blending system, a slider interface display including a slider moveable on a line between two endpoints, wherein a first position of the slider along the line corresponds to a value of at least one liquid sensory characteristic;

receiving user input for moving the slider from the first position to a second position on the line;

determining a value of the at least one liquid sensory characteristic based on the second position; and determining a second liquid blend recipe for a blend of the first liquid and the second liquid, wherein the proportions of the first liquid and the second liquid in the first liquid blend recipe are determined by using as inputs at least the proportions of the first liquid blend and the determined value of the at least one liquid sensory characteristic.

16. The liquid blending method of claim 1, wherein the liquids are beverages.

17. The liquid blending method of claim 16, wherein the beverages are wines.

18. A liquid system, comprising:

a liquid blending system comprising:

at least one liquid database including data for each of a plurality of liquids;

at least one user database including data for each of a plurality of users;

a computing device including a processor and non-transitory memory;

a liquid blending application configured to run on the computing device, the liquid blending application in communication with the at least one liquid database and the at least one user database;

a user interface in communication with the liquid blending application and configured to receive input from a user; and a display in communication with the liquid blending application, wherein the liquid blending system is configured to:

display, on the display, a whiteboard area defining a workspace for liquid blend manipulation and a graphical indication of each of a plurality of liquids;

receive a first liquid selection input from a user of the plurality of users, wherein the first liquid selection input includes selecting a first liquid of the plurality of liquids and selecting a first coordinate location in the whiteboard area;

associate the first liquid with the first coordinate location;

in response to receiving the first liquid selection input, update the display to show a graphical indication of the first liquid, wherein the graphical indication of the first liquid is shown at the first coordinate location;

receive a second liquid selection input from the user, wherein the second liquid selection input includes selecting a second liquid of the plurality of liquids and selecting a second coordinate location in the whiteboard area;

associate the second liquid with the second coordinate location;

in response to receiving the second liquid selection input, update the display to show, in addition to graphical indication of the first liquid shown at the first coordinate location, a graphical indication of the second liquid, wherein the graphical indication of the second liquid is shown at the second coordinate location; and determine a first liquid blend recipe for a blend of the first liquid and the second liquid, wherein the proportions of the first liquid and the second liquid in the first liquid blend recipe are determined using an algorithm including as inputs the first coordinate location and the second coordinate location.

19. The liquid system of claim 18, further comprising:

a liquid dispensing system in communication with the liquid blending system, wherein the liquid dispensing system is fluidly coupled to the first liquid and the second liquid for dispensing blends of the first liquid and the second liquid, wherein the liquid dispensing system is configured to:

receive from the computing device an instruction to dispense a first liquid serving according to the first liquid blend recipe; and dispense the first liquid serving.

20. The liquid system of claim 19, wherein the liquid dispensing system further comprises:

a programmable logic controller (PLC) configured to receive from the liquid blending system the instruction to dispense the first liquid serving according to the first liquid blend recipe;

at least two containers, wherein each container holds a liquid, wherein a first container of the at least two containers holds the first liquid and a second container of the at least two containers holds the second liquid;

at least one pump, wherein each pump is communicatively coupled to the computing device and fluidly coupled to one of the at least two containers;

a mixing block fluidly coupled to each container via the corresponding pump and configured to receive a first amount of the first liquid and a second amount of the second liquid according to the first liquid blend recipe and mix the liquid amounts to create the first liquid serving, wherein each pump is further configured to pump the liquid amounts to the mixing block in response to receiving an instruction via the computing device for pumping the designated amount of the corresponding liquid; and a nozzle fluidly coupled to the mixing block and configured to dispense the first liquid serving.

21. The liquid system of claim 20, the liquid dispensing system further comprising:

a programmable logic controller (PLC) communicatively interposed between the computing device and each pump.

22. The liquid system of claim 21, the liquid dispensing system further comprising:

a relay communicatively interposed between the PLC and each pump.

23. The liquid system of claim 19, wherein the liquid dispensing system further comprises:

a programmable logic controller (PLC) configured to receive from the liquid blending system the instruction to dispense the first liquid serving according to the first liquid blend recipe;

at least two containers, wherein each container holds a liquid, wherein a first container of the at least two containers holds the first liquid and a second container of the at least two containers holds the second liquid, wherein each container is pressurized by a compressed inert gas;

at least one valve, wherein each valve is communicatively coupled to the liquid blending system and fluidly coupled to one of the at least two containers, whereby the liquid in the corresponding pressurized container flows through the valve when the valve is open;

a mixing block fluidly coupled to each container via the corresponding valve and configured to receive a first amount of the first liquid and a second amount of the second liquid according to the first liquid blend recipe and mix the liquid amounts to create the first liquid serving, wherein each valve is further configured to open for a certain amount of time in response to receiving an instruction via the computing device for conveying the designated amount of the corresponding liquid; and a nozzle fluidly coupled to the mixing block and configured to dispense the first liquid serving.

24. The liquid system of claim 18, wherein, after dispensing the first liquid serving, the liquid blending system is further configured to:

receiving of user input evaluating the liquid serving and determining a second liquid blend recipe based at least on the first coordinate location, the second coordinate location, and the user input; and updating the display to show a graphical indication of the second liquid blend recipe.

25. The liquid system of claim 24, wherein the liquid dispensing system is further configured to:

receive from the liquid blending system an instruction to dispense a second liquid serving according to the second liquid blend recipe; and dispense the second liquid serving.

26. The liquid system of claim 18, wherein the liquid blending system is further configured to associate the first liquid blend recipe with the user and store the first liquid blend recipe and the association in a liquid blend database in communication with the liquid blending system.

27. The liquid system of claim 18, wherein the liquid blending system is further configured to store data associated with the user in a user profile of a liquid blend database in communication with the liquid blending system, and wherein the algorithm further includes as input at least one datum from the user profile.

28. The liquid system of claim 18, wherein the graphical indication of the first liquid further includes a percentage of the first liquid in the first liquid blend recipe and the graphical indication of the second liquid further includes a percentage of the second liquid in the first liquid blend recipe.

29. The liquid system of claim 18, wherein, for each liquid, the proportion of that liquid in the first liquid blend corresponds only with the value of that liquid's coordinate location on the y-axis of the whiteboard area.

30. The liquid system of claim 18, wherein, for each liquid, the proportion of that liquid in the first liquid blend corresponds with the value of that liquid's coordinate location on the x-axis of the whiteboard area.

31. The liquid system of claim 18, wherein the liquid blending system is further configured to, prior to receiving of the first liquid selection input, display on the display of the liquid blending system a graphical indication for each of at least two liquids available for selection.

32. The liquid system of claim 18, wherein the liquid blending system is further configured to:

receive a third liquid selection input from a user, wherein the third liquid selection input includes selecting a third liquid of the plurality of liquids and selecting a third coordinate location in the whiteboard area;

associate the third liquid with the third coordinate location;

in response to receiving the third liquid selection input, update the display to show, in addition to the graphical indication of the first liquid shown at the first coordinate location and the second liquid shown at the second coordinate location, a graphical indication of the third liquid, wherein the graphical indication of the third liquid is shown at the third coordinate location; and determine a second liquid blend recipe for a blend of the first liquid, the second liquid, and the third liquid, wherein the proportions of the first liquid, the second liquid, and the third liquid in the second liquid blend recipe are determined using the algorithm, including as further input to the algorithm the third coordinate location.

33. The liquid system of claim 18, wherein the liquid blending system is further configured to:

display a slider interface display including a slider moveable on a line between two endpoints, wherein a first position of the slider along the line corresponds to a value of at least one liquid sensory characteristic;

receive user input for moving the slider from the first position to a second position on the line;

determine a value of the at least one liquid sensory characteristic based on the second position; and determine a second liquid blend recipe for a blend of the first liquid and the second liquid, wherein the proportions of the first liquid and the second liquid in the first liquid blend recipe are determined by using as inputs at least the proportions of the first liquid blend and the determined value of the at least one liquid sensory characteristic.

34. The liquid system of claim 18, wherein the liquids are beverages.

35. The liquid system of claim 34, wherein the beverages are wines.

* * * * *